(12) United States Patent
Zaus et al.

(10) Patent No.: US 11,160,006 B2
(45) Date of Patent: Oct. 26, 2021

(54) ACCESS CONTROL MECHANISM

(71) Applicant: Apple Inc., Cupertino, CA (US)

(72) Inventors: Robert Zaus, Munich (DE); Marta Martinez Tarradell, Hillsboro, OR (US); Ana Lucia Pinheiro, Hillsboro, OR (US); Sudeep K. Palat, Cheltenham (GB); Chen-ho Chin, Deerlijk (BE); Richard C. Burbidge, Shrivenham (GB); Alexandre Saso Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/499,067

(22) PCT Filed: May 3, 2018

(86) PCT No.: PCT/US2018/030840
§ 371 (c)(1),
(2) Date: Sep. 27, 2019

(87) PCT Pub. No.: WO2018/204609
PCT Pub. Date: Nov. 8, 2018

(65) Prior Publication Data
US 2021/0092668 A1    Mar. 25, 2021

Related U.S. Application Data

(60) Provisional application No. 62/502,393, filed on May 5, 2017, provisional application No. 62/542,701, filed on Aug. 8, 2017.

(51) Int. Cl.
*H04W 48/02*    (2009.01)
*H04W 76/27*    (2018.01)
(Continued)

(52) U.S. Cl.
CPC ............. *H04W 48/02* (2013.01); *H04W 8/02* (2013.01); *H04W 48/08* (2013.01); *H04W 60/00* (2013.01);
(Continued)

(58) Field of Classification Search
CPC ..... H04W 48/02; H04W 76/27; H04W 76/10; H04W 8/02; H04W 48/08; H04W 60/00; H04W 74/08; H04W 84/042
(Continued)

(56) References Cited

U.S. PATENT DOCUMENTS

2012/0290870 A1    11/2012    Shah et al.
2013/0324118 A1    12/2013    Iwamura et al.
(Continued)

FOREIGN PATENT DOCUMENTS

WO        2016006948 A1        1/2016
WO    WO-2016006980 A1        1/2016
(Continued)

OTHER PUBLICATIONS

Intel Corporation; "An analysis of access barring control indicated in c1-171293/R2-1702441"; 3GPP TSG CT WG1 Meeting #103; Spokane, WA; Apr. 3, 2017; 5 pages.
(Continued)

*Primary Examiner* — Mong-Thuy T Tran
(74) *Attorney, Agent, or Firm* — Kowert, Hood, Munyon, Rankin & Goetzel, P.C.

(57) ABSTRACT

A user equipment (UE) can include processing circuitry configured to decode system information including access barring parameters for one or more access categories for accessing a cell of a next generation Node-B (gNB). A network access attempt is detected by a control plane layer of the UE that is higher than a Radio Resource Control (RRC) layer. The processing circuitry map s, using a Non-
(Continued)

Access Stratum (NAS) layer of the control plane, the network access attempt to at least one access category of a plurality of available access categories based on mapping rules. The processing circuitry performs an access barring check procedure for the mapped at least one access category based on the access barring parameters. Upon determining that access to the cell is not barred, a NAS message is encoded for transmission to an Access and Mobility Management Function (AMF), e.g. an Attach Request message to perform an attach procedure.

20 Claims, 23 Drawing Sheets

(51) Int. Cl.
| | |
|---|---|
| *H04W 76/10* | (2018.01) |
| *H04W 8/02* | (2009.01) |
| *H04W 48/08* | (2009.01) |
| *H04W 60/00* | (2009.01) |
| *H04W 74/08* | (2009.01) |
| *H04W 84/04* | (2009.01) |

(52) U.S. Cl.
CPC ........... *H04W 74/08* (2013.01); *H04W 76/10* (2018.02); *H04W 76/27* (2018.02); *H04W 84/042* (2013.01)

(58) Field of Classification Search
USPC ......................................................... 370/328
See application file for complete search history.

(56) References Cited

U.S. PATENT DOCUMENTS

| | | | |
|---|---|---|---|
| 2015/0036489 A1* | 2/2015 | Rajadurai | H04W 48/02 370/230 |
| 2015/0189673 A1 | 7/2015 | Park et al. | |
| 2015/0215845 A1* | 7/2015 | Pinheiro | H04W 48/06 455/418 |
| 2015/0223146 A1* | 8/2015 | Pinheiro | H04W 48/02 370/230 |
| 2016/0227469 A1* | 8/2016 | Kim | H04W 4/14 |
| 2017/0006447 A1* | 1/2017 | Bahta | H04W 4/90 |
| 2018/0199261 A1* | 7/2018 | Lee | H04W 48/16 |
| 2020/0137664 A1* | 4/2020 | Lee | H04W 48/02 |
| 2020/0187092 A1* | 6/2020 | Lindheimer | H04W 48/10 |
| 2020/0221370 A1 | 7/2020 | Futaki | |
| 2020/0314943 A1* | 10/2020 | Kim | H04W 76/27 |

FOREIGN PATENT DOCUMENTS

| | | |
|---|---|---|
| WO | 2017017890 A1 | 2/2017 |
| WO | WO-2017017890 A1 | 2/2017 |

OTHER PUBLICATIONS

Extended European Search Report for Patent Application No. EP 18794459; dated Oct. 10, 2020; 13 pages.
"International Application Serial No. PCT/US2018/030840, International Search Report dated Sep. 5, 2018", 4 pgs.
"International Application Serial No. PCT/US2018/030840, Written Opinion dated Sep. 5, 2018", 8 pgs.

* cited by examiner

| UE CHARACTERISTIC OR TYPE OF ACCESS ATTEMPT | REQUIREMENTS TO BE MET | (MATCH TO) ACCESS CATEGORY |
|---|---|---|
| UE OF ACCESS CLASS 11 | ACCESS CLASS 11 APPLICABLE IN SELECTED PLMN | 1 |
| UE OF ACCESS CLASS 12 | ACCESS CLASS 12 APPLICABLE IN SELECTED PLMN | 2 |
| UE OF ACCESS CLASS 13 | ACCESS CLASS 13 APPLICABLE IN SELECTED PLMN | 3 |
| UE OF ACCESS CLASS 14 | ACCESS CLASS 14 APPLICABLE IN SELECTED PLMN | 4 |
| UE OF ACCESS CLASS 15 | ACCESS CLASS 15 APPLICABLE IN SELECTED PLMN | 5 |
| EMERGENCY SESSION | UE IS ATTEMPTING ACCESS FOR AN EMERGENCY SESSION | 6 |
| UE OF ACCESS CLASS 0 TO 9 (RESPONDING TO PAGING) | UE BELONGS TO AN ACCESS CLASS BETWEEN 0 TO 9. REQUESTED RRC CONNECTION IS FOR MT ACCESS | 0 |
| UE OF ACCESS CLASS 0 TO 9 (MO SIGNALLING) | UE BELONGS TO AN ACCESS CLASS BETWEEN 0 TO 9. REQUESTED RRC CONNECTION IS FOR MO SIGNALING | 7 |
| UE OF ACCESS CLASS 0 TO 9 (MO DATA) | UE BELONGS TO AN ACCESS CLASS BETWEEN 0 TO 9. REQUESTED RRC CONNECTION IS FOR MO DATA | 8 |
| UE OF ACCESS CLASS 0 TO 9 (CONFIGURED FOR EAB) | UE BELONGS TO AN ACCESS CLASS BETWEEN 0 TO 9. REQUESTED RRC CONNECTION IS SUBJECT TO EAB WITH CATEGORY A | A1 (=EABa) |
| UE OF ACCESS CLASS 0 TO 9 (CONFIGURED FOR EAB) | UE BELONGS TO AN ACCESS CLASS BETWEEN 0 TO 9. REQUESTED RRC CONNECTION IS SUBJECT TO EAB WITH CATEGORY B (NOT IN HPLMN/EHPLMN) | A2 (=EABb) |
| UE OF ACCESS CLASS 0 TO 9 (CONFIGURED FOR EAB) | UE BELONGS TO AN ACCESS CLASS BETWEEN 0 TO 9. REQUESTED RRC CONNECTION IS SUBJECT TO EAB WITH CATEGORY C (NEITHER IN HPLMN/EHPLMN NOR IN MOST PREFERRED VPLMN OF VISITED COUNTRY) | A3 (=EABc) |

FIG. 7

| AC FOR MMTEL VOICE IS SUPPORTED | AC FOR MMTEL VIDEO IS SUPPORTED | AC FOR SMS IS SUPPORTED | ACCESS CATEGORY TO USE FOR MMTEL VOICE SERVICE | ACCESS CATEGORY TO USE FOR MMTEL VIDEO SERVICE | ACCESS CATEGORY TO USE FOR SMS |
|---|---|---|---|---|---|

FIG. 8

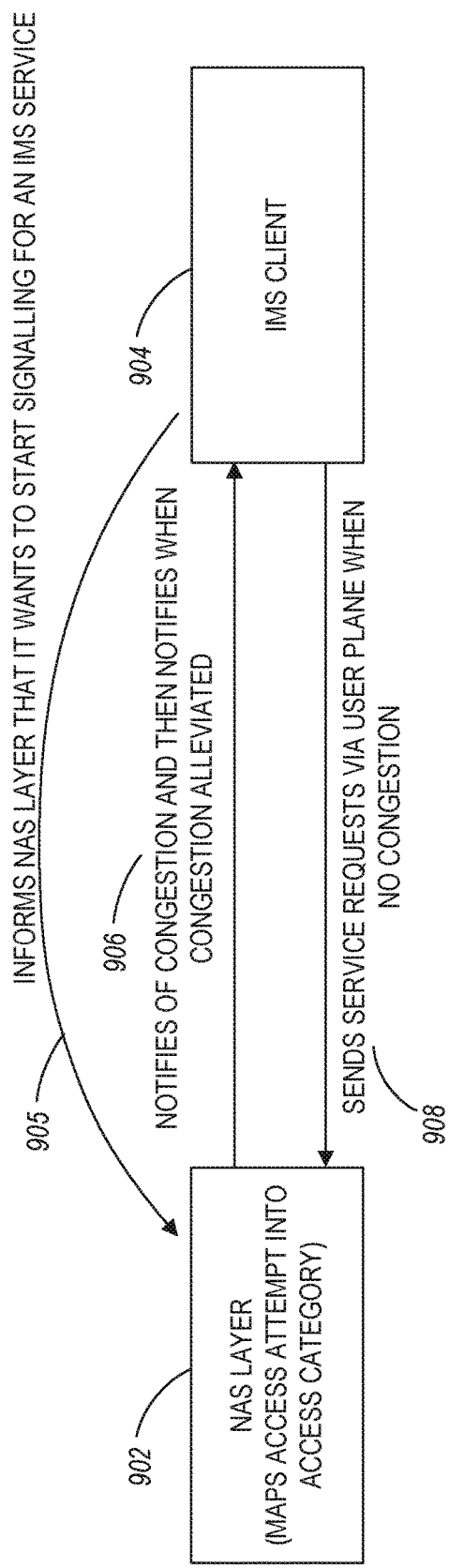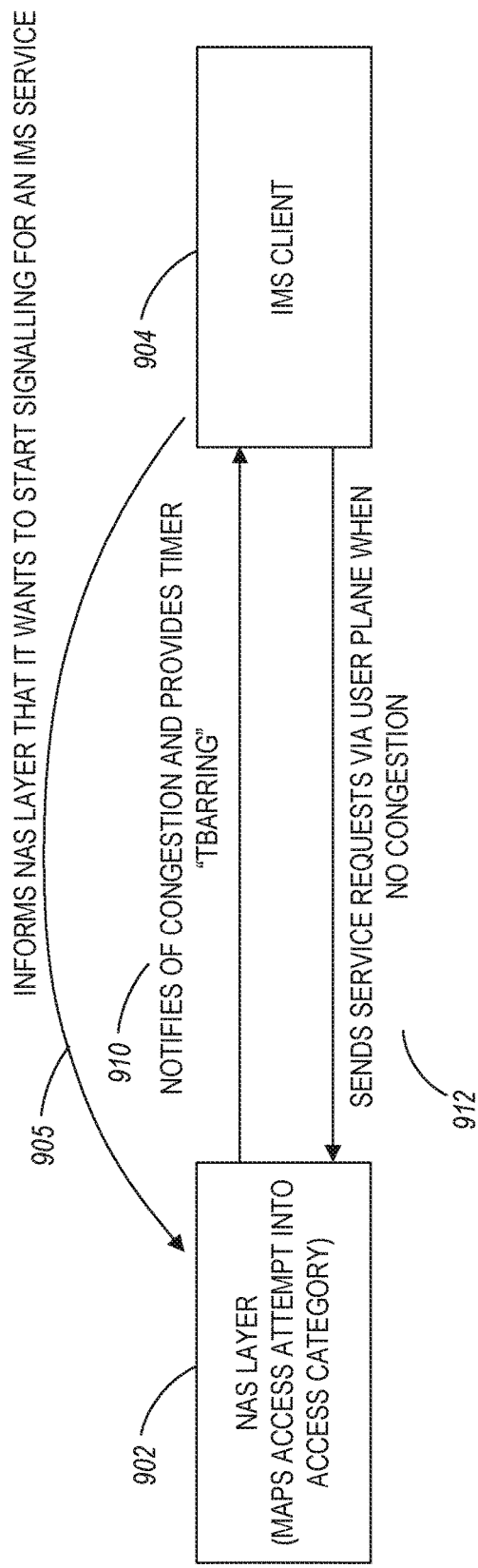
FIG. 9A
FIG. 9B

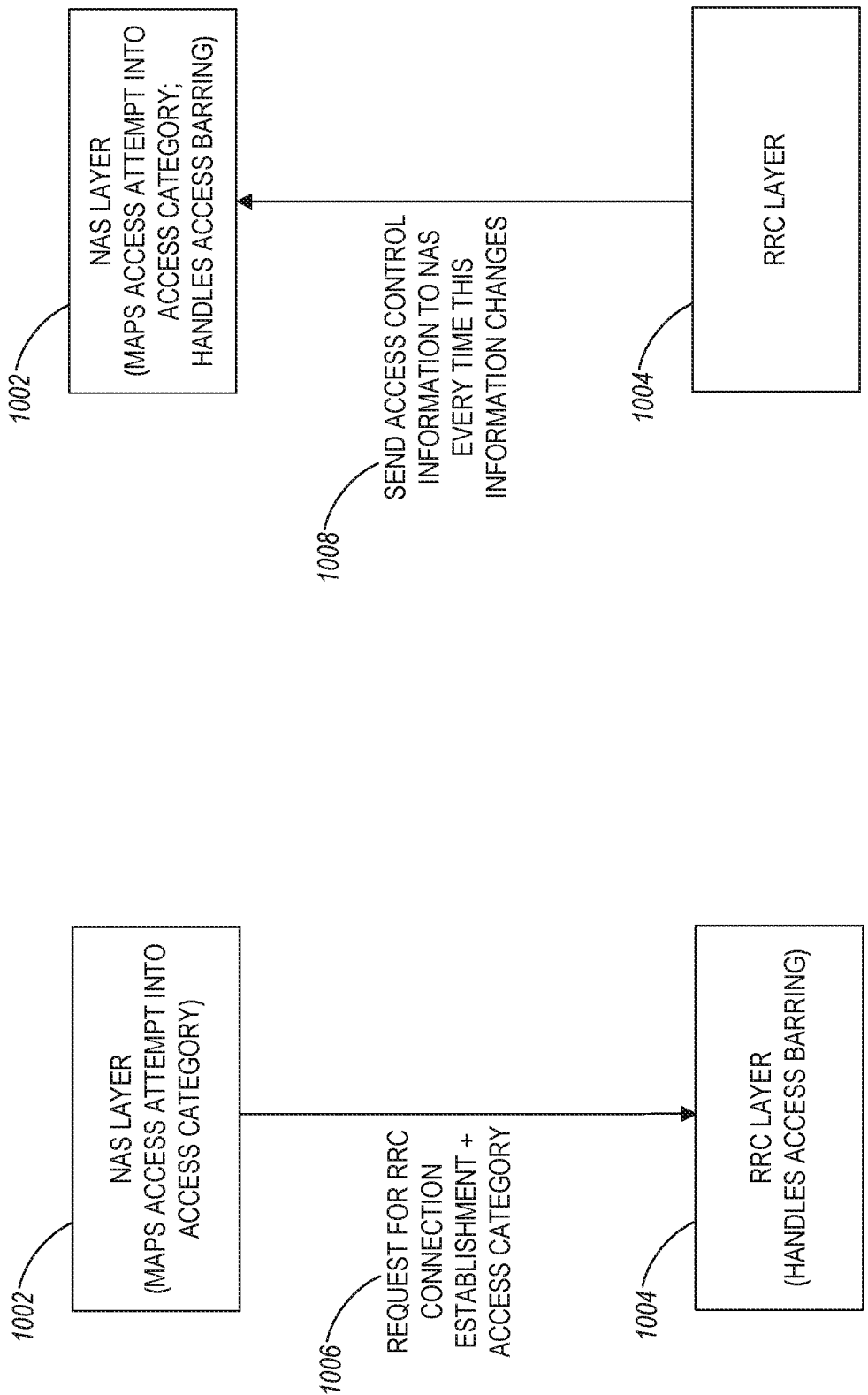

| COL 1 | COLUMN 2 | COLUMN 3 | COLUMN 4 | COLUMN 5 |
|---|---|---|---|---|
| PROCESSING RULE # / ORDER OF PROCESSING | UE CHARACTERISTIC OR TYPE OF ACCESS ATTEMPT | REQUIREMENTS TO BE MET | IF REQUIREMENT IS MET, ACCESS CATEGORY FOUND | FURTHER ACTION |
| 1 | RESPONSE TO PAGING | REQUESTED RRC CONNECTION IS FOR MT ACCESS | 0 (= MT_ACC) | NOTE 1 THIS RULE IS TO ALLOW NAS TO CLASSIFY THAT THE ATTEMPT IS FOR RESPONSE TO PAGING. SUCH AN ACCESS ATTEMPT IS NOT SUBJECT TO ACCESS CONTROL AND THE RAN WILL NOT BROADCAST BARRING PARAMETERS FOR "ACCESS CATEGORY 0" |
| 2 | UE OF ACCESS CLASS 0 TO 9 (EMERGENCY SESSION) | UE IS ATTEMPTING ACCESS FOR AN EMERGENCY SESSION | 6 (= EMERGENCY) | NOTE 1 |
| 3 | UE OF ACCESS CLASS 11 TO 15 (EMERGENCY SESSION) | UE IS ATTEMPTING ACCESS FOR AN EMERGENCY SESSION AND IS A UE CONFIGURED TO USE AC11–15 IN SELECTED PLMN | 6 (= EMERGENCY) | REGARDLESS CATEGORYFOUND, GO TO RULE 4 |
| 4 | UE OF ACCESS CLASS 11 | ACCESS CLASS 11 APPLICABLE IN SELECTED PLMN | 1 (= AC11) | REGARDLESS CATEGORYFOUND, GO TO RULE 5 |
| 5 | UE OF ACCESS CLASS 12 | ACCESS CLASS 12 APPLICABLE IN SELECTED PLMN | 2 (= AC12) | REGARDLESS CATEGORYFOUND, GO TO RULE 6 |
| 6 | UE OF ACCESS CLASS 13 | ACCESS CLASS 13 APPLICABLE IN SELECTED PLMN | 3 (= AC13) | REGARDLESS CATEGORYFOUND, GO TO RULE 7 |

FIG. 11A

| COL 1 | COLUMN 2 | COLUMN 3 | COLUMN 4 | COLUMN 5 |
|---|---|---|---|---|
| 7 | UE OF ACCESS CLASS 14 | ACCESS CLASS 14 APPLICABLE IN SELECTED PLMN | 4 (= AC14) | REGARDLESS CATEGORY FOUND, GO TO RULE 8 |
| 8 | UE OF ACCESS CLASS 15 | ACCESS CLASS 15 APPLICABLE IN SELECTED PLMN | 5 (= AC15) | REGARDLESS CATEGORY FOUND, GO TO RULE 9 |
| 9 | | UE IS A UE CONFIGURED TO USE AC11-15 IN SELECTED PLMN | | NOTE 1 RULE 9 IS CREATED TO ALLOW EXIT FROM TABLE. IF NO ACCESS CATEGORIES FOUND SO FAR, CONTINUE TO RULE 10. |
| 10 | UE OF ACCESS CLASS 0 TO 9 (CONFIGURED FOR EAB) | UE BELONGS TO AN ACCESS CLASS BETWEEN 0 AND 9. REQUESTED RRC CONNECTION IS SUBJECT TO EAB WITH CATEGORY A | A1 (= EABa) NOTE 2. | REGARDLESS CATEGORY FOUND, GO TO RULE 11 |
| 11 | UE OF ACCESS CLASS 0 TO 9 (CONFIGURED FOR EAB) | UE BELONGS TO AN ACCESS CLASS BETWEEN 0 AND 9. REQUESTED RRC CONNECTION IS SUBJECT TO EAB WITH CATEGORY B (NOT IN HPLMN/EHPLMN) | A2 (= EABb) NOTE 2. | REGARDLESS CATEGORY FOUND, GO TO RULE 12 |
| 12 | UE OF ACCESS CLASS 0 TO 9 (CONFIGURED FOR EAB) | UE BELONGS TO AN ACCESS CLASS BETWEEN 0 AND 9. REQUESTED RRC CONNECTION IS SUBJECT TO EAB WITH CATEGORY C (NEITHER IN HPLMN/EHPLMN NOR IN MOST PREFERRED VPLMN OF VISITED COUNTRY) | A3 (= EABc) NOTE 2. | REGARDLESS CATEGORY FOUND, GO TO RULE 13 |
| 13 | UE OF ACCESS CLASS 0 TO 9 (ACCESS FOR MO MMTEL VOICE CALL) | UE BELONGS TO AN ACCESS CLASS BETWEEN 0 AND 9. REQUESTED RRC CONNECTION IS FOR MO MMTEL VOICE CALL OR NAS SIGNALLING CONNECTION RECOVERY DURING ONGOING MO MMTEL VOICE CALL | B1 (= MO MMTEL VOICE) | IF MATCHING, STOP. NOTE 3. ELSE, GOTO NEXT RULE. |
| 14 | UE OF ACCESS CLASS 0 TO 9 (ACCESS FOR MO MMTEL VIDEO CALL) | REQUESTED RRC CONNECTION IS FOR MO MMTEL VIDEO CALL OR NAS SIGNALLING CONNECTION RECOVERY DURING ONGOING MO MMTEL VIDEO CALL | B2 (= MO MMTEL VIDEO) | IF MATCHING, STOP. NOTE 3. ELSE, GOTO NEXT RULE. |

FIG. 11B

| COL 1 | COLUMN 2 | COLUMN 3 | COLUMN 4 | COLUMN 5 |
|---|---|---|---|---|
| 15 | UE OF ACCESS CLASS 0 TO 9 (ACCESS FOR SMS OR SMSoIP) | UE BELONGS TO AN ACCESS CLASS BETWEEN 0 AND 9. REQUESTED RRC CONNECTION IS FOR MO SMS OR SMSoIP TRANSFER OR NAS SIGNALING CONNECTION RECOVERY DURING ORGOING MO SMS OR SMSoIP TRANSFER | B3 (= MO SMS AND SMSoIP) | IF MATCHING, STOP. NOTE 3. ELSE, GOTO NEXT RULE. |
| 16 | UE OF ACCESS CLASS 0 TO 9 (MO SIGNALLING) | UE BELONGS TO AN ACCESS CLASS BETWEEN 0 AND 9. REQUESTED RRC CONNECTION IS FOR MO SIGNALLING | 7 (= MO_SIG) | IF MATCHING, STOP. NOTE 3. ELSE, GOTO NEXT RULE. |
| 17 | UE OF ACCESS CLASS 0 TO 9 (MO DATA) | UE BELONGS TO AN ACCESS CLASS BETWEEN 0 AND 9. REQUESTED RRC CONNECTION IS FOR MO DATA | 8 (= MO_DATA) | IF MATCHING, STOP. NOTE 3. ELSE, GOTO NEXT RULE. |

FIG. 11C

ACCESS CONTROL MECHANISM

PRIORITY CLAIM

This application is a U.S. National Stage Filing under 35 U.S.C. 371 from International Application No. PCT/US2018/030840, filed on May 3, 2018, which claims the benefit of priority to U.S. Provisional Patent Application Ser. No. 62/502,393, filed May 5, 2017, and entitled "ACCESS CONTROL MECHANISM", and U.S. Provisional Patent Application Ser. No. 62/542,701, filed Aug. 8, 2017, and entitled "ACCESS CONTROL MECHANISM". The each of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR)(or 5G-NR) networks and 5G-LTE networks. Other aspects are directed access control mechanisms in wireless networks.

BACKGROUND

Mobile communications have evolved significantly from early voice systems to today's highly sophisticated integrated communication platform. With the increase indifferent types of devices communicating with various network devices, usage of 3GPP LTE systems has increased. The penetration of mobile devices (user equipment or UEs) in modem society has continued to drive demand for a wide variety of networked devices in a number of disparate environments.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

The use of networked UEs using 3GPP LTE systems has increased in areas of home and work life. Fifth generation (5G) wireless systems are forthcoming, and are expected to enable even greater speed, connectivity, and usability. Next generation 5G networks are expected to increase throughput, coverage, and robustness and reduce latency and operational and capital expenditures. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Further enhanced operation of LTE systems in the licensed as well as unlicensed spectrum is expected in future releases and 5G systems. Such enhanced operations can include techniques to address traffic overload, access control functionalities, and unified access barring mechanisms.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, byway of example, but not byway of limitation, various aspects discussed in the present document.

FIG. 7 is an illustration of a default set of access categories in accordance with some aspects.

FIG. 8 is a representation of well-known services that are subject to access control and the access categories associated to such services in accordance with some aspects.

FIG. 9A and FIG. 9B illustrate example communication between a NAS layer and an IMS client for access category detection in accordance with some aspects.

FIG. 10A and FIG. 10B illustrate example communication between a NAS layer and an RRC layer for access barring handling in accordance with some aspects.

FIG. 11A, FIG. 11B, and FIG. 11C illustrate example rules and conditions for default and well-known set of access categories in accordance with some aspects.

DETAILED DESCRIPTION

Figure 1A:
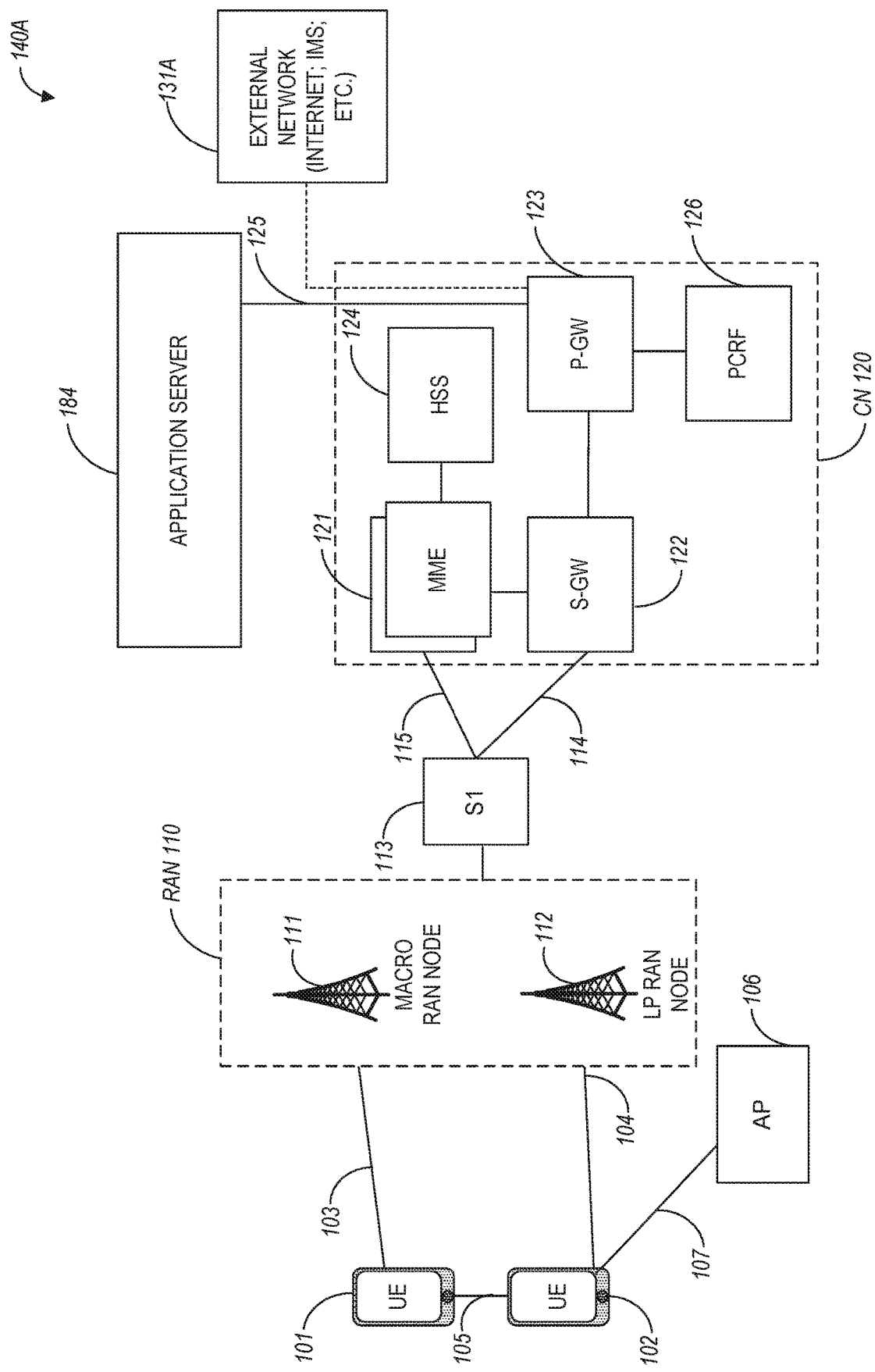
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation)(D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radiophone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDM A) communication technique (e.g., for downlink communications) or a Singe Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UEs Internet Protocol Connectivity Access Network (IP-CAN) session. In a roaming scenario with local breakout of traffic, there may be two PCRFs associated with a UEs IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF)(not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments. Techniques disclosed herein can be used in connection with FeNB-IoT communications and, more specifically, mitigating the inter-cell interference effect for NPRACH and NPUSCH in small cell environments as well as improving downlink coverage when transmission power of a small cell base station is smaller than base station transmission power in a microcell.

Figure 1B:
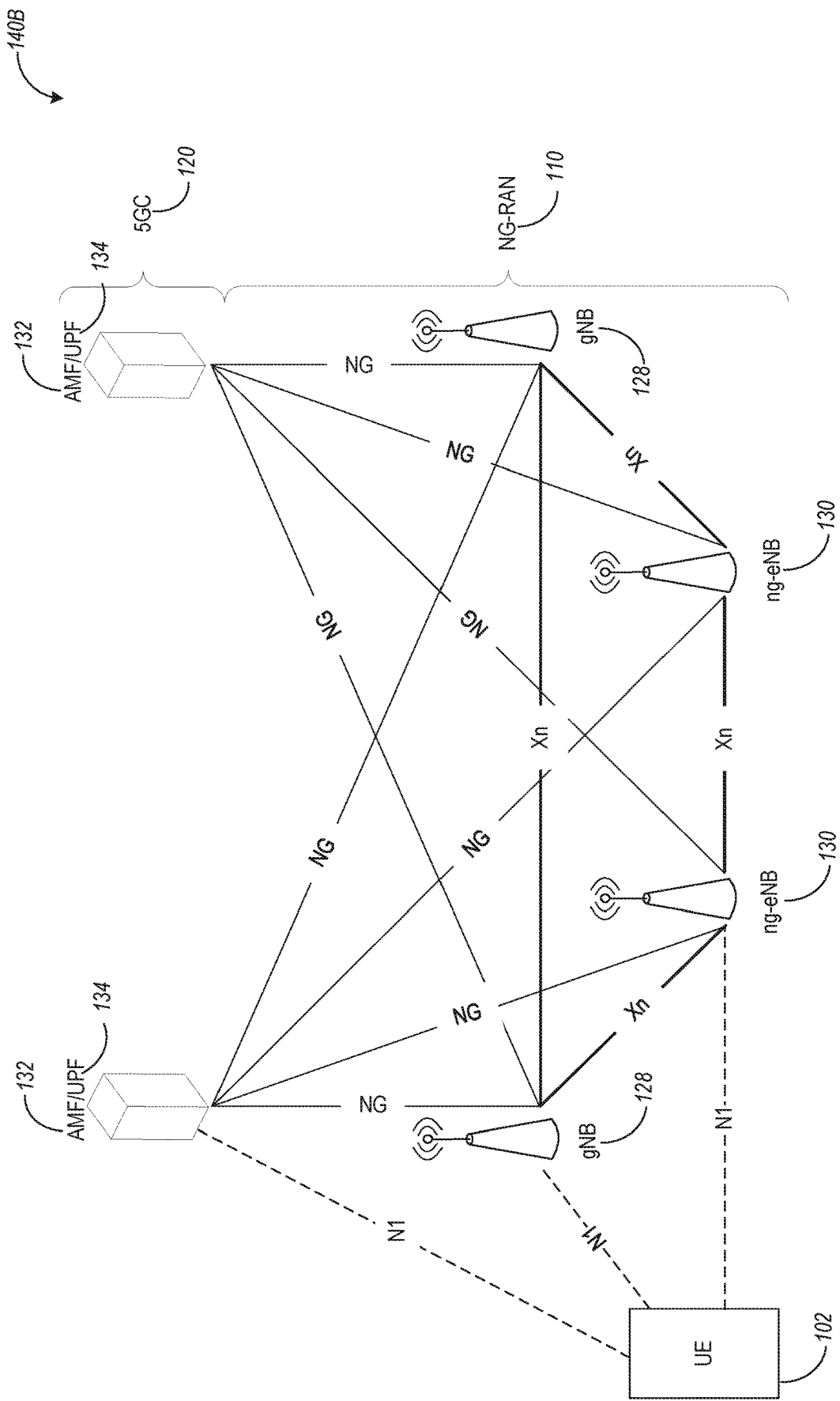
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include anode providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as abase station, a mobile edge server, a small cell, a home eNB, and so forth.

Figure 1C:
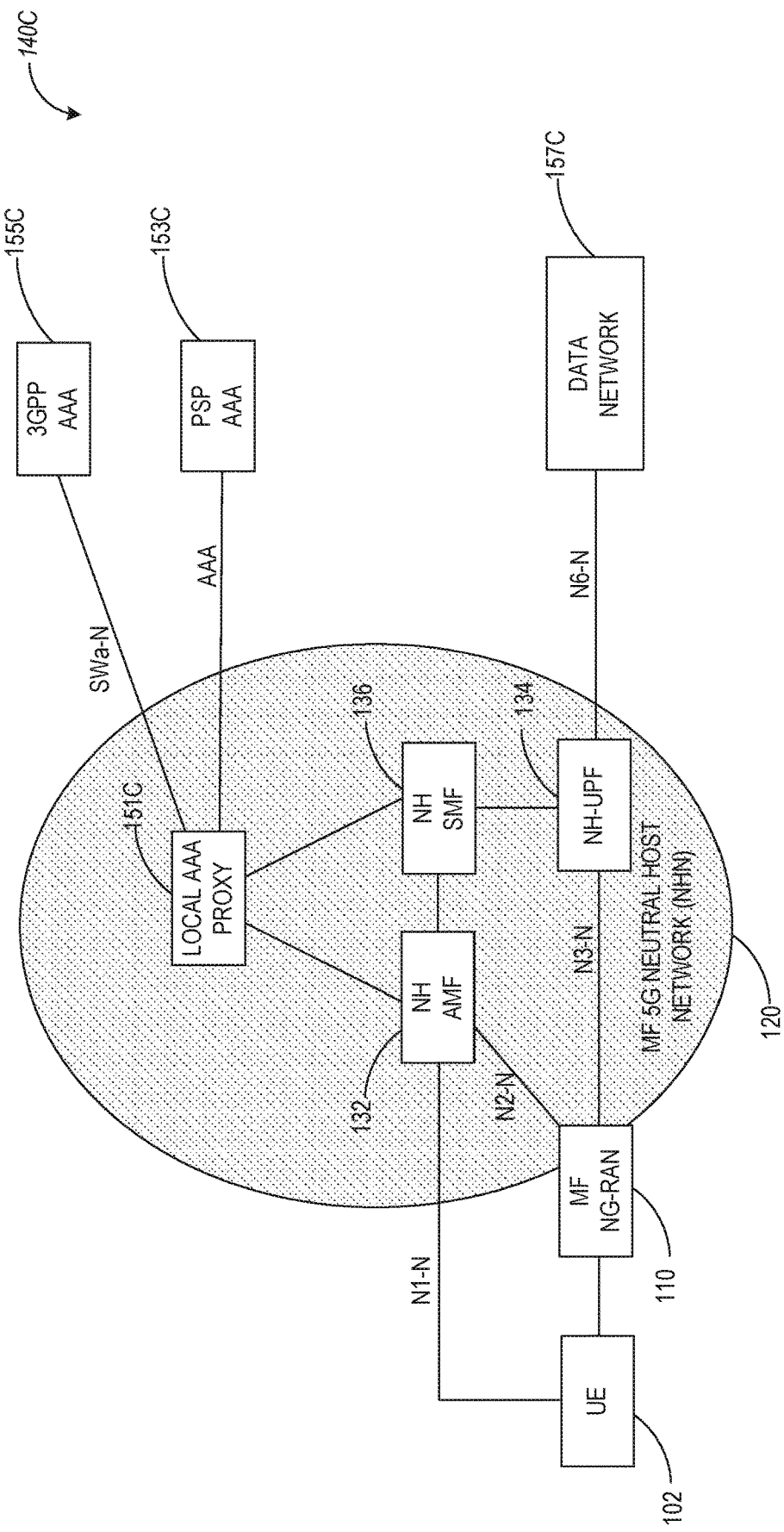
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (M F NG-RAN), and the core network 120 can be a MulteFire 5G neutral host network (NHN).

In some aspects, the MF NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SM F 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
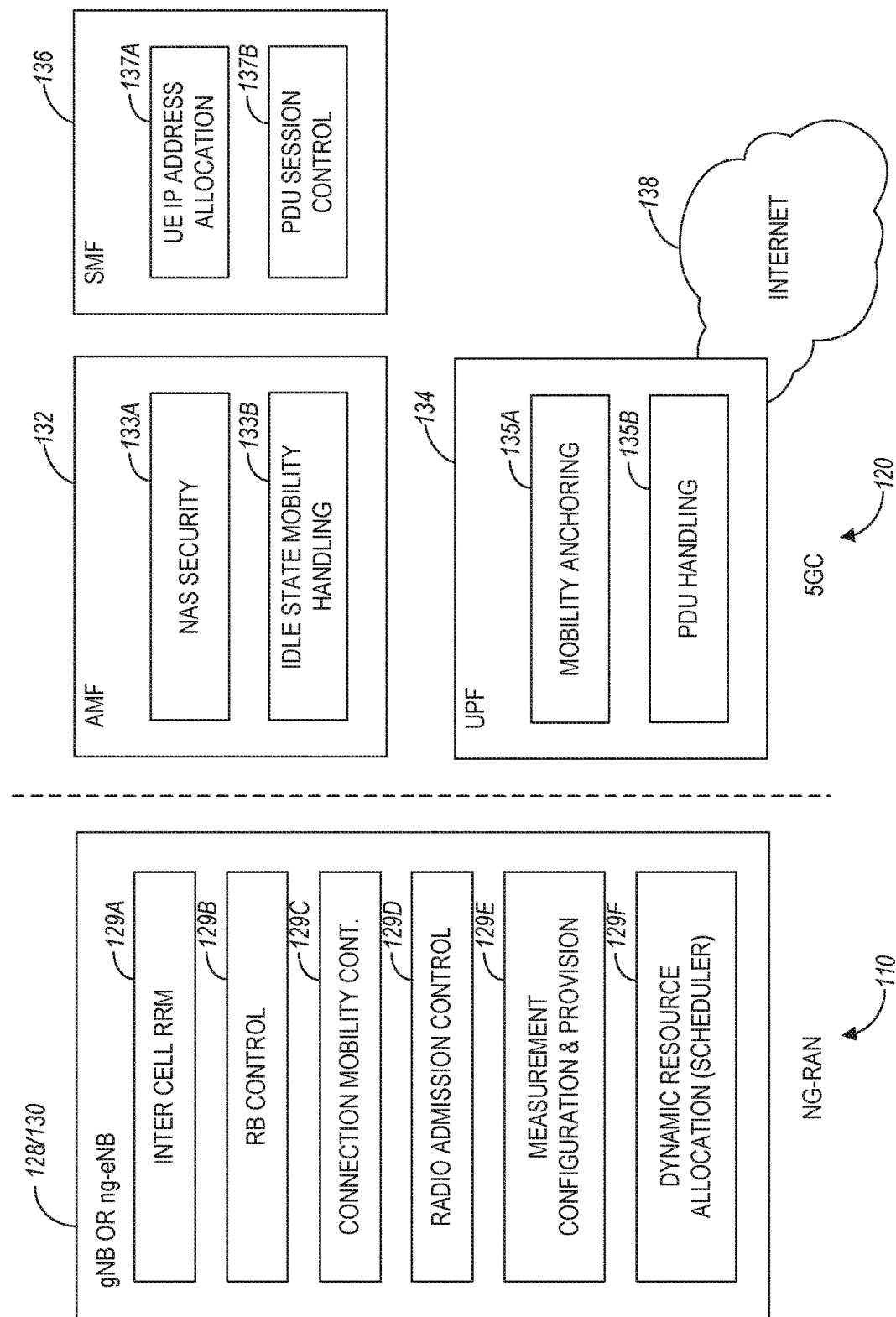
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing QoS flow management and mapping to data radio bearers; support of UEs in RRC_INACTIVE state; distribution function for non-access stratum (NAS) messages; radio access network sharing dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding packet inspection and user plane part of policy rule enforcement; traffic usage reporting uplink classifier to support routing traffic flows to a data network; branching point to support multi-homed PDU session; QoS handling for user plane, e.g., packet filtering gating UL/DL rate enforcement; uplink traffic verification (SDF to QoS flow mapping); and/or downlink packet buffering and downlink data notification triggering among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
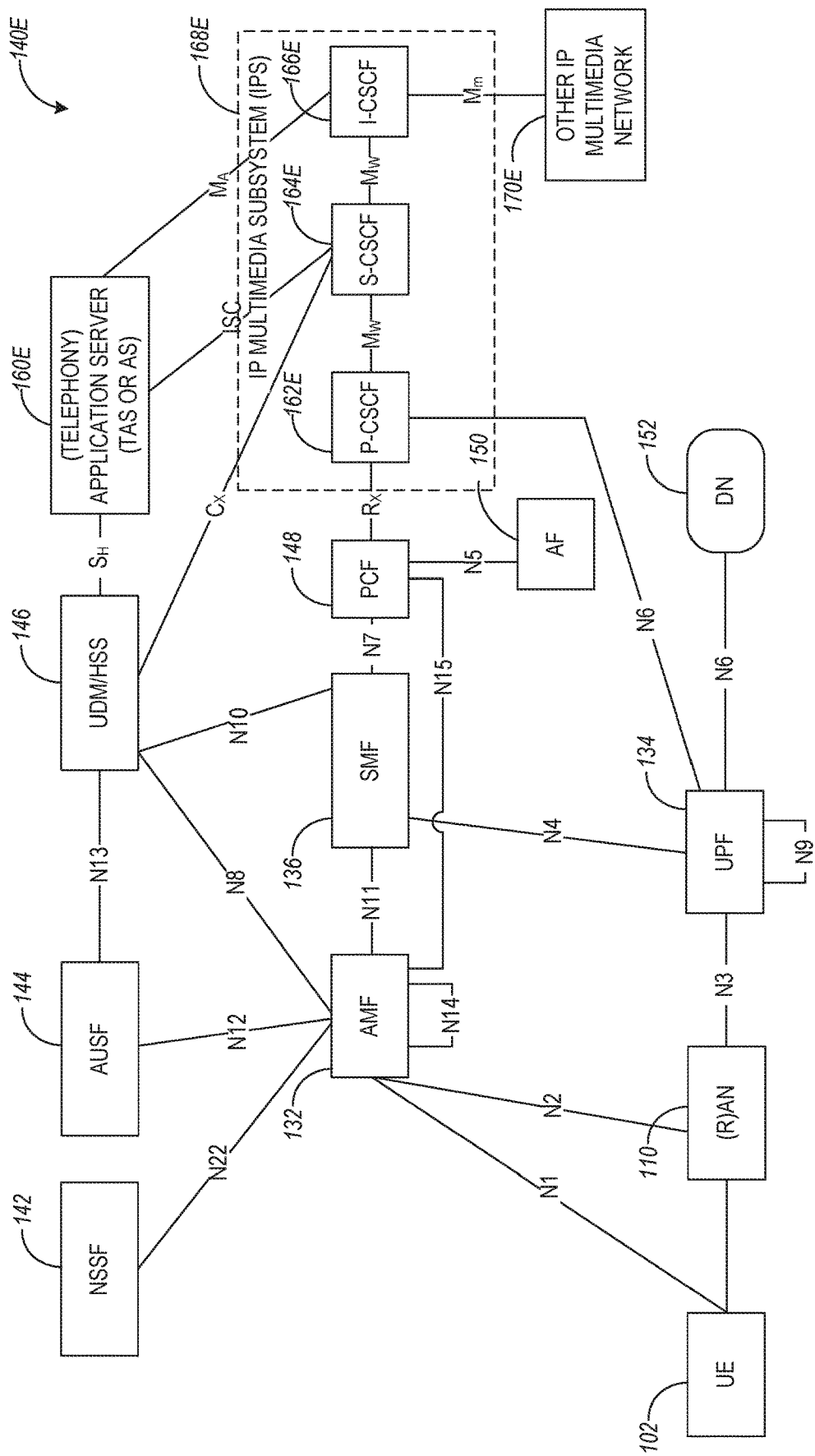
FIG. 1E and FIG. 1F illustrate a non-roaming 5G system architecture in accordance with some aspects.
Figure 1F:
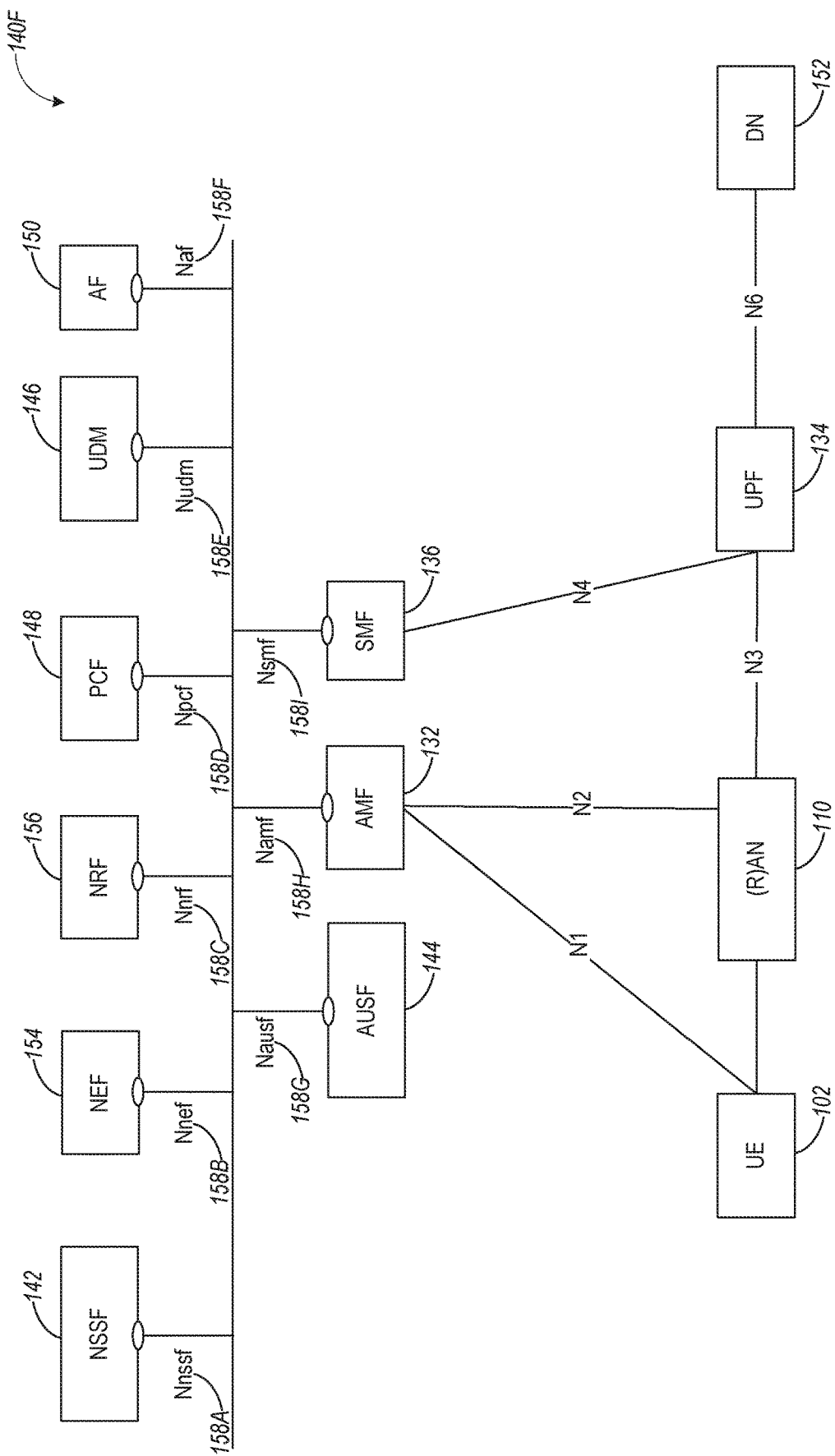

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use a unified access barring mechanism using one or more of the techniques described herein, which access barring mechanism can be applicable for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

Referring to FIG. 1F, there is illustrated a 5G architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SM F 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
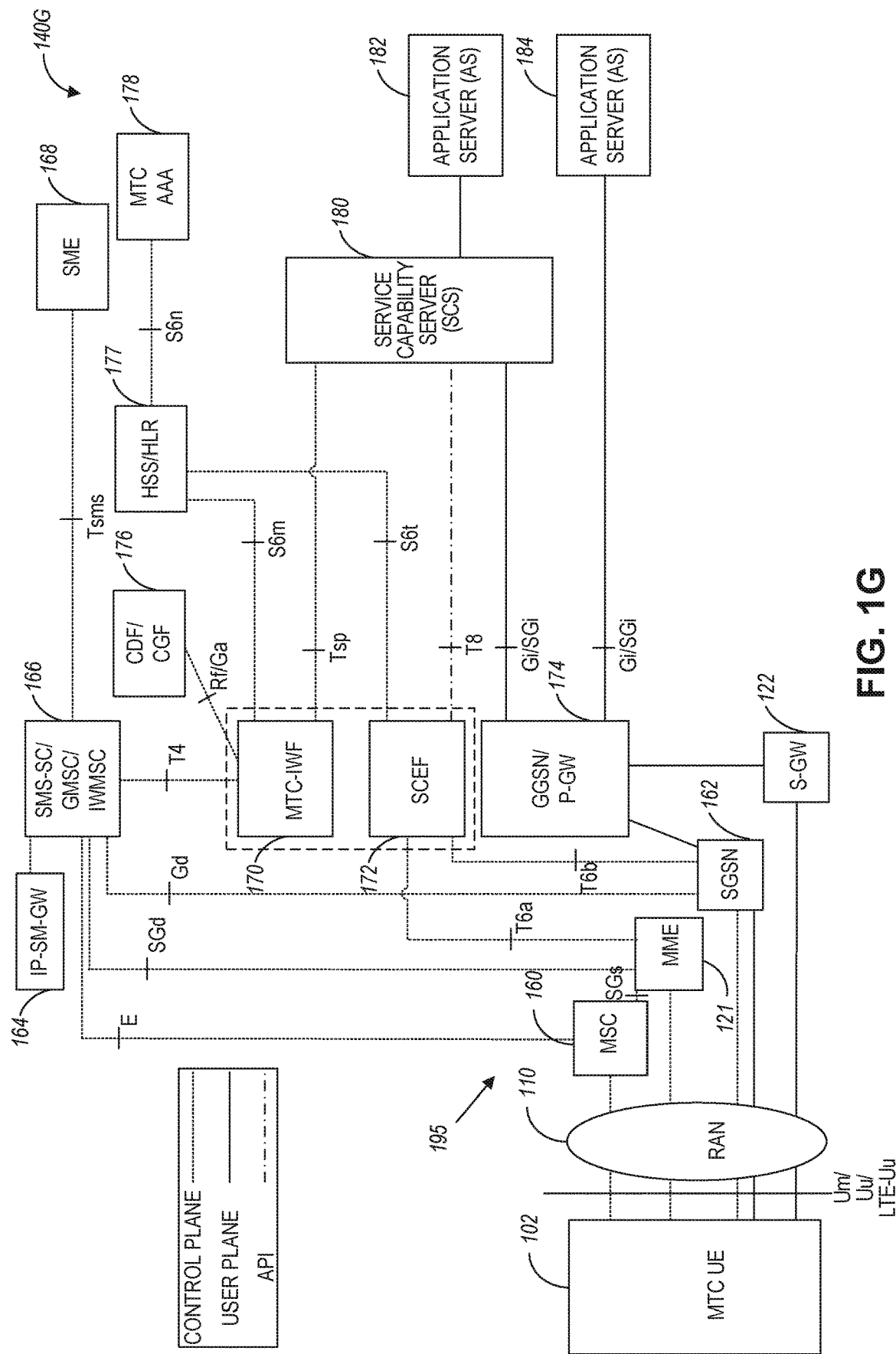
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having for example, among other things, a Service Capability Server (SCS) 180, an Application Server (AS) 182, or one or more other external servers or network components.

The RAN 110 can be coupled to the HSS/ILR servers 177 and the AAA servers 178 using one or more reference points including for example, an air interface based on an S6a reference point, and configured to authenticate/authorize CIoT UE 102 to access the CIoT network. The RAN 110 can be coupled to the CIoT network architecture 140G using one or more other reference points including for example, an air interface corresponding to an SGi/Gi interface for 3GPP accesses. The RAN 110 can be coupled to the SCEF 172 using for example, an air interface based on a T6a/T6b reference point, for service capability exposure. In some aspects, the SCEF 172 may act as an API GW towards a third-party application server such as AS 182. The SCEF 172 can be coupled to the HSS/ILR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
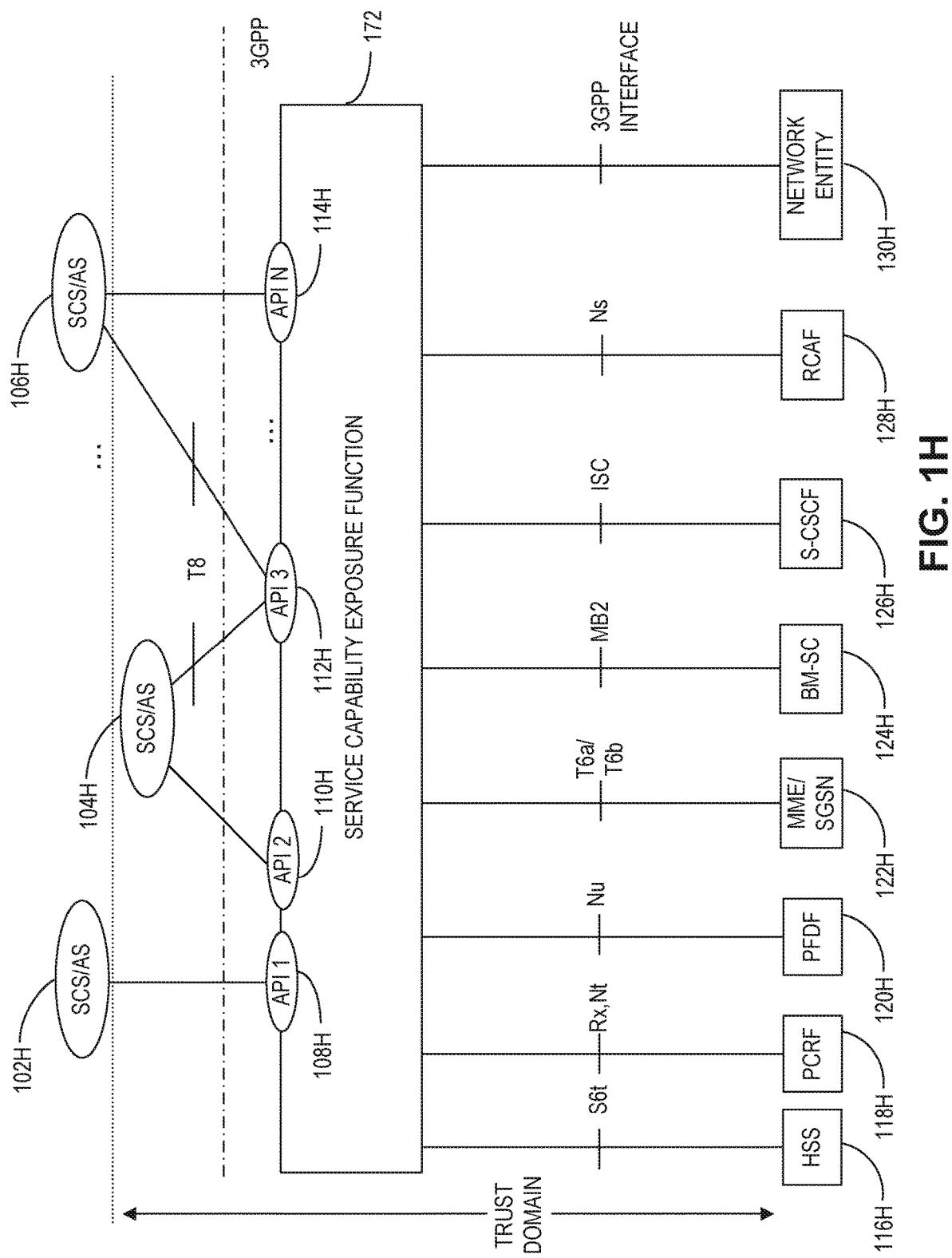
FIG. 1H illustrates an example Service Capability Exposure Function (SCEF) in accordance with some aspects.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
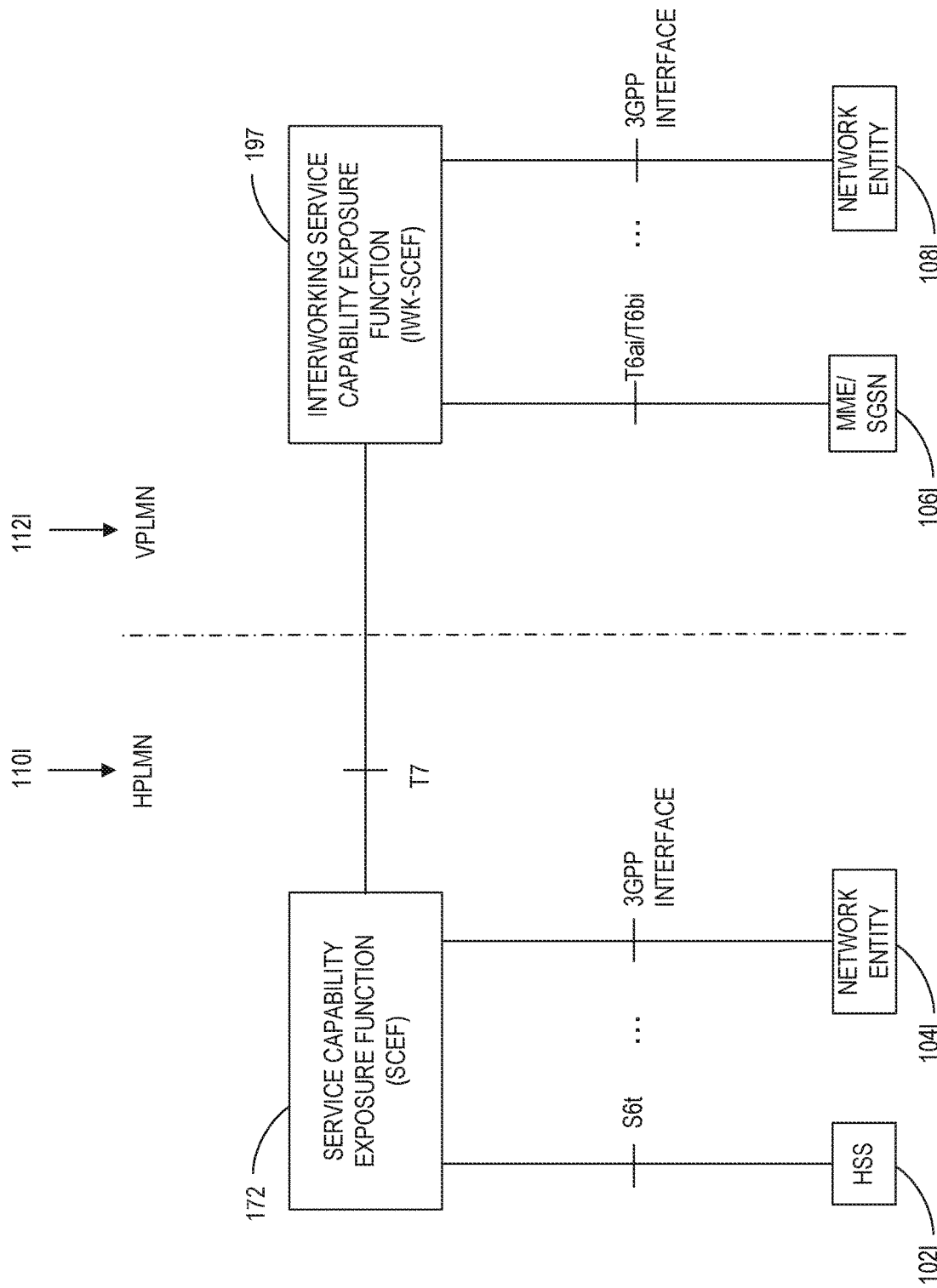
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 2:
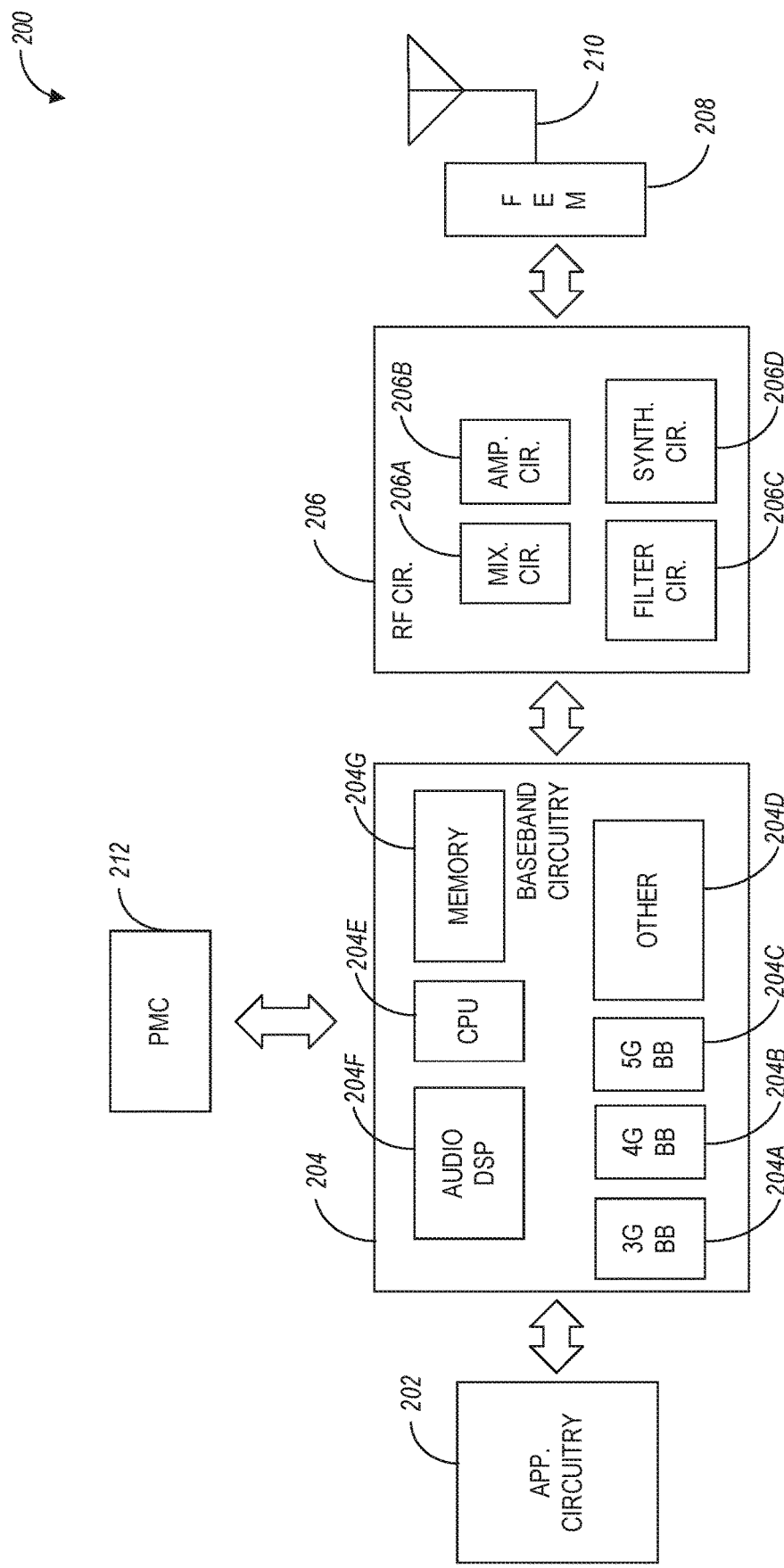
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding radio frequency shifting etc. In some aspects, modulation/demodulation circuitry of the baseband circuitry 204 may include Fast-Fourier Transform (FFT), precoding or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s)(DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WM AN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling battery charging and/or DC-to-DC conversion. The PMC 212 may, in some aspects, be included when the device 200 is capable of being powered by a battery, for example, when the device is included in a UE. The PM C 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
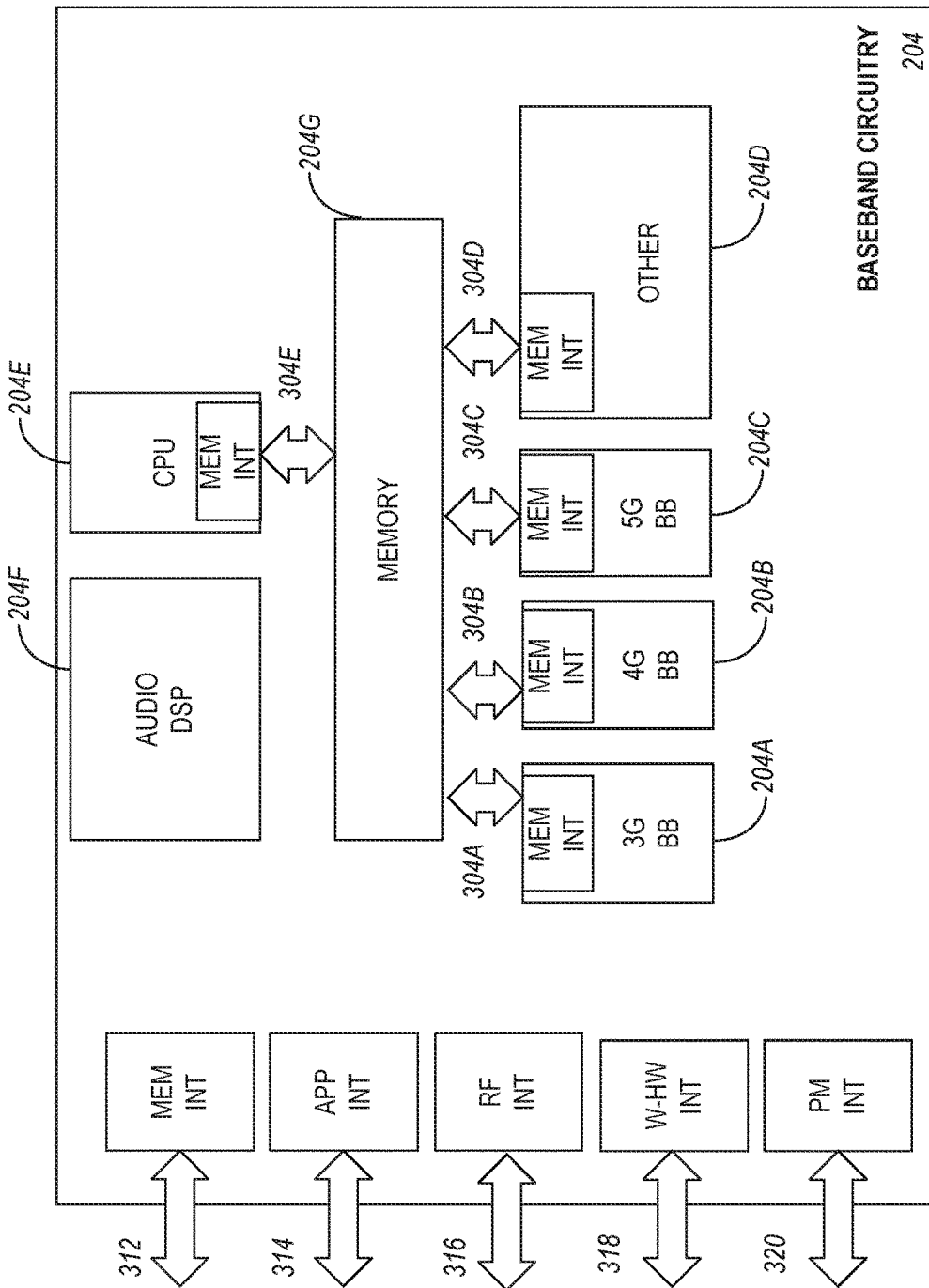
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
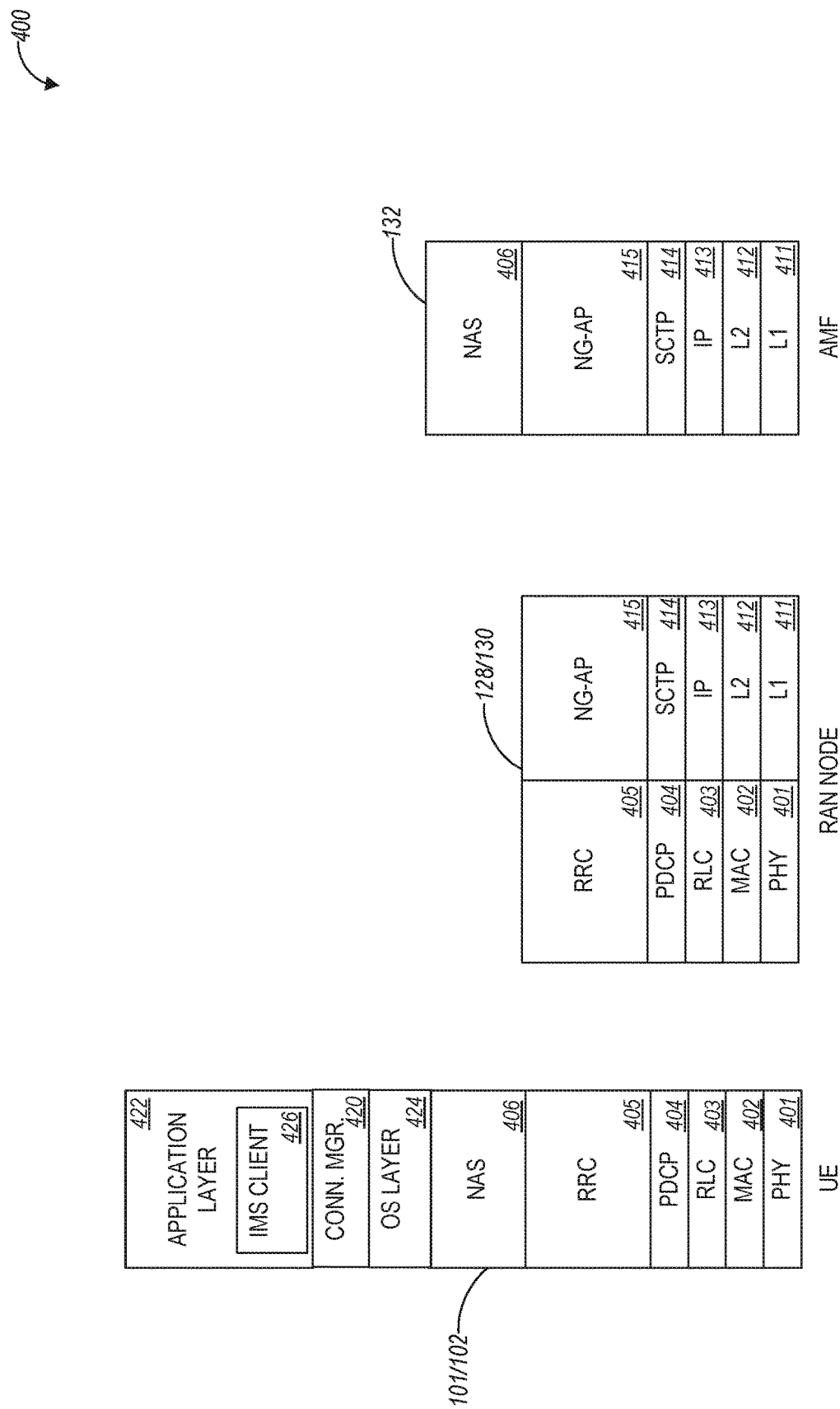
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving rate matching mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting error correction through hybrid automatic repeat request (HARK), and logical channel prioritization.

The RLC layer 403 may in some aspects operate in a plurality of modes of operation, including Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering deciphering integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging RRC connection establishment, RRC connection addition, RRC connection modification, and RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS 406 in the UE and the NAS 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
| --- | --- | --- | --- |
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the AMF 132 as illustrated in FIG. 4. In aspects, the NAS protocols 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non UE-associated services. These services perform functions including but not limited to: UE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 layer 412, the IP layer 413, the SCTP layer 414, and the S1-AP layer 415.

Figure 5:
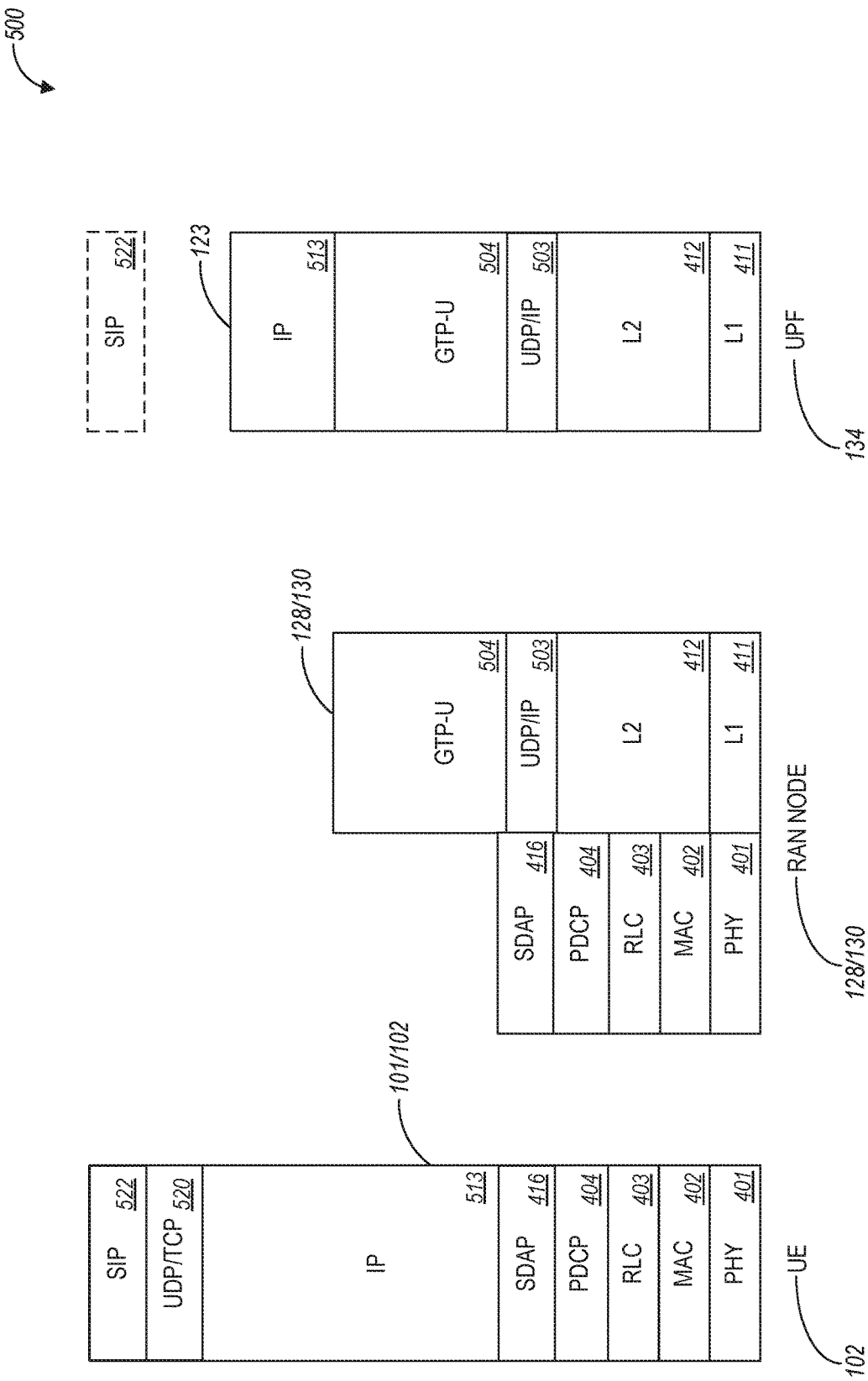
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB) and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520, and can be used by the UE 102 and the UPF 134.

The General Packet Radio Service (GPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
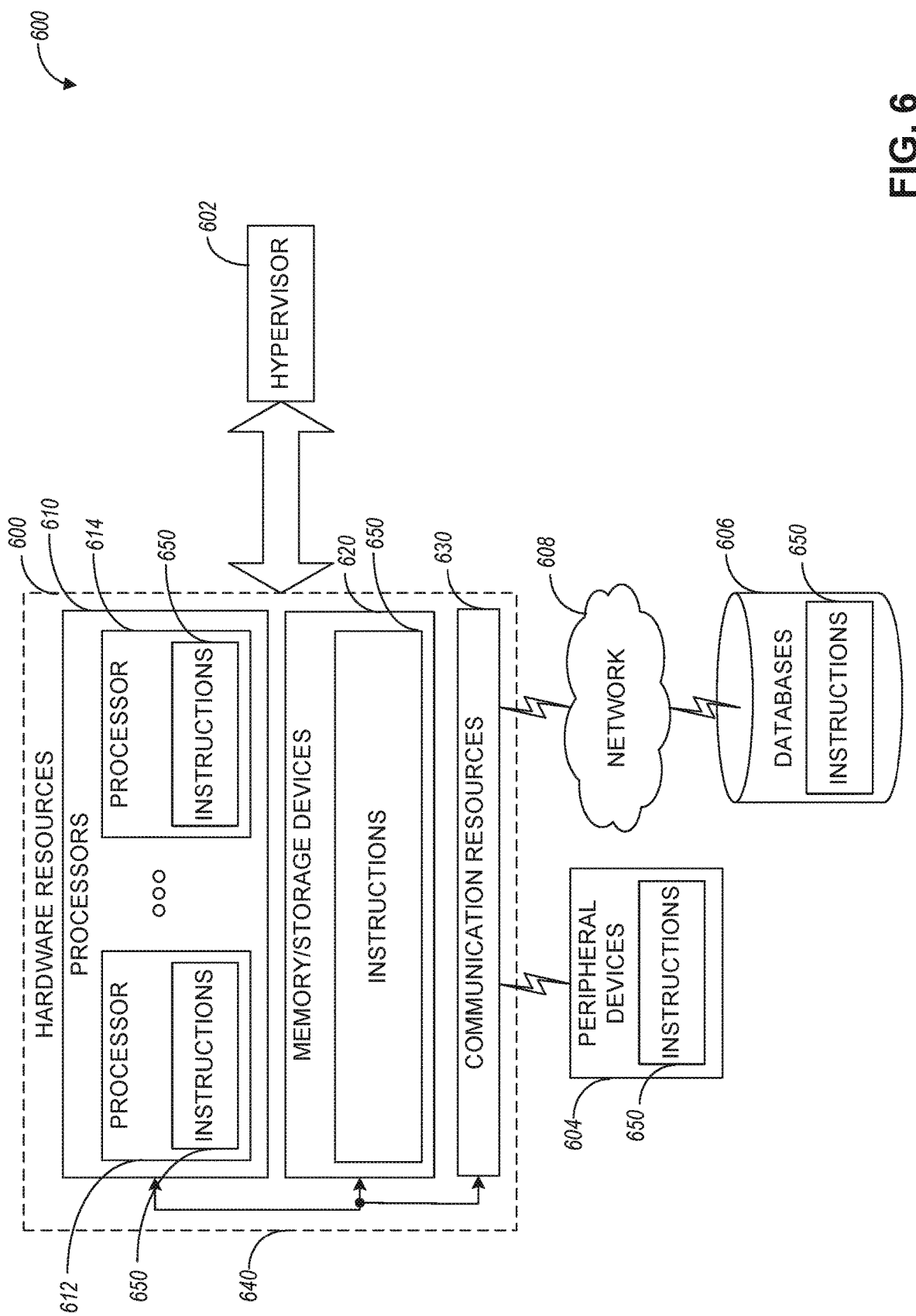
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

FIG. 7 is an illustration of a default set of access categories in accordance with some aspects.

In some aspects, 5G access control (AC) mechanisms used within a 5G communication system can take into account at least the following access related information: access class, relationship between the UE and the PLMN the UE is accessing whether the UE is delay tolerant, and the type of access attempt. Due to the support of different network slices in a 5G communication system, access control can also be based on the network slice that the UE is trying to access.

In some aspects, 5G AC techniques disclosed herein can be based on the usage of different access categories for purposes of accessing-related information. In some aspects, one or more of the following approaches can be used to define the access categories: (a) all access categories are defined in a wireless specification; (b) all access categories are configurable (e.g. via Open Mobile Alliance (OMA) or NAS signaling); and (c) a mixture of approaches (a) and (b).

In some aspects, in order to use 5G AC techniques in diverse scenarios, including e.g., initial attach (initial registration) or TAU (mobility registration update) of the UE to a network after PLMN selection, inbound roaming in a VPLMN, idle mode mobility between PLMNs (i.e. inter-PLMN TAU, inter-PLMN mobility registration update), or access for the purpose of emergency communication or high priority calls, approach (c) can be used so that some access categories can be predefined and some access categories can be configurable by the mobile operator.

Sets of Access Categories:

Set 1. In some aspects, a 5G wireless architecture could use a standardized (or default) set of access categories, which can be referred to as a "default set of access categories". The minimum default set of access categories (and corresponding AC policy rules, describing the mapping of access attempts to these categories), can be common across multiple wireless networks and can be defined within an applicable wireless specification (e.g., one or more 3GPP specifications). The default set of access categories can include the following access categories which can be used for prioritizing resources and alleviating congestion in a (V)PLMN: Mobile Originating (MO) signaling (1 category), emergency (1 category), special access classes AC11-15 (5 categories), low priority for machine-type communications (MTC)(i.e., Extended Access Barring (EAB)—3 categories, such as EABa, EABb, and EABc, with each category corresponding to a specific relationship between the UE and the visited PLMN).

Set 2. In some aspects, to enable acceptable service for the roaming subscriber and enable the VPLMN to control access attempts while aiming at inbound roamers, a set of access categories can be provided (e.g., using L3 signalling messages) by the serving PLMN to the UE at initial registration or registration updates. This set of access categories can be used to cover well-known services like IMS voice, IMS video, and SMS. This set of access categories can be referred to as the "set of well-known access categories" or the "signaled set" of (well-known) access categories. The set of well-known access categories can include MO data (1 category), IMS voice/video (i.e., Service Specific Access Control (SSAC)—2 categories), and SMS (1 category).

In some aspects, an additional access category 0 ("null") can be defined for UE internal processing of paging responses (i.e., this access category can be applicable whenever the UE responds to a paging). The network would not broadcast any barring parameters for access category 0, as it is assumed that replying to a paging is always allowed. When the NAS layer needs to access the network in order to respond to a paging it would indicate access category 0 to the RRC layer, which indicates a request to skip any access barring checks).

Set 3. In some aspects, a configurable set of access categories can be provided e.g. through Open Mobile Alliance (OM A) or NAS signaling for use within a PLMN in an operator-specific way. For example, the network operator can define or configure corresponding policy rules associated with the configurable set of access categories. In some aspects, the configurable set of access categories can be applied to inbound roamers under the control of a VPLMN (e.g., through peer-to-peer signaling broadcasts or otherwise).

In some aspects, access categories can be used to enable access control for higher layers that are not part of 3GPP. As an example, the Rel-14 LTE functionality of access control for unattended data traffic (UDT), which is controlled at higher layers that are not part of 3GPP, can be implemented to enhance the 5G access control.

Default Set of Access Categories

Referring to FIG. 7, there is illustrated a table 700 illustrating several access categories (e.g., access categories 1 through 8 and A1-A3) that can be used for the default set of access categories. Table 700 further includes a UE characteristic or type of access attempt as well as requirements to be met for each of the indicated access categories.

As seen in table 700, the default set of access categories can be associated with a UE with access class 11-15 or the following types of access attempt: emergency session, response to paging MO signaling MO data, and extended access barring (EAB) for MTC communications.

An example communication scenario associated with EAB is as follows. When a certain area of PLMN A goes out of service, UEs registered to that PLMN A can attempt to register to other PLMNs that are available. Devices used for MTC are often using a subscription from abroad so that they can register with any PLMN in the visited country. To enable the other PLMNs to control the access by these new inbound roamers, specifically to enable the PLMNs to deprioritize inbound devices used for MTC without affecting the own 'normal' UEs, the networks can use EAB. Note that for this scenario, the UE configured for EAB was registered to PLMN A, so it may have some access control configuration information applicable for PLMN A (received from PLMN A or from its HPLMN), but typically the UE has not been registered to the new selected PLMN B before, and it can only rely on the default set of access categories. If the default set of access categories does not include a category for EAB, then the new inbound roaming UE will use the access category for MO signalling Thus the UE will get 'better' access conditions than, e.g., a UE configured for EAB which is already registered to PLMN B and has received access control configuration information for PLMN B including the access categories for EAB. Alternatively, if PLMN B activates access control for the access category MO signalling then this will have a negative impact on all UEs in the PLMN.

In this regard, UEs configured for EAB communication and the associated access categories (e.g., EABa, EABc, EABc) can be included in the default set of access categories so that EAB will be considered at initial registration attempts even when the "signaled set" and the "configurable set" of access categories are not available or not yet known by the UE (e.g., at the time the visited network was selected).

Signaled Set of Well-Known Access Categories

In some aspects, the signaled set of well-known categories can be used by the serving PLMN to better fit access categorization to access attempts. While such functionality can be achieved through the configurable set (i.e., OM A MO), the well-known set allows flexible and efficient way for the serving network to pick and categorize the access categories to fit certain deployed (basic) services, such as MMTEL video, MMTEL voice, SMS. Using the signaled set of well-known access categories, network operators can also address scenarios where the serving PLMN cannot yet run (or choose not y et to run) OM A DM to configure the MO. Moreover, this would lessen the "size" of and the standardization work required for the configurable set of access categories (set 3).

To enable access categorization and access control for the well-known basic services, the signaled information can include the following (a) what are the well-known services; (b) access categorization of access attempts for the well-known services which are subject to access control; and (c) the respective access categories for the well-known services.

FIG. 8 is a representation of well-known services that are subject to access control and the access categories associated to such services in accordance with some aspects. In some aspects, if the well-known services that a network operator wants access control to be applied are MMTEL voice, MMTEL video, and SMS, that serving PLMN can be configured to signal to the UE, some representation of table 800 in FIG. 8 with the above identified information to define the signaled set of well-known access categories. The information illustrated in table 800 is exemplary and is a logical representation. Additional configuration information can be signaled by the network operator in a single information element or a series of information elements, or portion of some information can be broadcasted (to multiple UEs) while other portions can be signaled (to one or more specific UEs).

Establishment Cause and Call Type

In some aspects, the UE RRC layer (e.g., 403) can be configured to receive the following types of information from the UE NAS layer (e.g., 406): the establishment cause, which maps to the information that is shared with the gNB via RRC (for instance msg3), and other information associated with the access attempt, which could be the access category (instead of the call type). In some aspects, when there is sufficient space in RRC msg3, then there is effectively a 1:1 mapping between access category to establishment cause (i.e., the same number of access categories and establishment causes can be defined). In some aspects, when there is not sufficient space in the RRC msg3, there can be N access categories and M establishment causes, where N is an integer greater than M. The RRC msg3 can be UL signaling sent from UE to gNB within the RACH procedure (e.g., RRC Connection request or RRC Connection Resume Request or other kind of message that may be sent).

In some aspects, a unified access barring mechanism based on one or more of the techniques described herein can be used in 5G system. More specifically, unified access barring can based on the following techniques described herein: (1) detection of the access category, (2) rules for access categorizations, and (3) access barring check for a given access category.

Detection of the Access Category

In some aspects, a new access attempt can be triggered in the following ways:

a) an upper layer not under 3GPP control (such as application layer 422, operating system layer 424, or connection manager layer 420), can detect that a certain application has started and can inform the NAS layer 406 accordingly;

b) an IMS client (e.g., 426) can trigger the new access attempt when an IMS voice/video call is initiated or an SMS over IMS transfer is detected; and c) the NAS layer 406 (e.g., when a Mobility Management (M) procedure is initiated, such as, due to mobility (TAU, mobility registration update) or due to a request from Session Management (SM), or from the Radio Access Bearer Manager (RABM) for pending UL packet in the user plane).

In some aspects, regardless which layer triggers the access, a unique (single) layer can be used to handle the mapping to an the access category. In some aspects, the unique layer that can handle the mapping can be the NAS layer 406. In this way, the need to define solutions like ACB-skip in LTE can be avoided, which was used due to the independent, duplicate barring being applied by the NAS and the IMS layer for services like IMS voice.

When the NAS layer detects that anew access attempt is to be initiated, the NAS layer can be configured to decide on the associated access category(s) (i.e., the NAS layer would be responsible for performing the mapping between a new access attempt and the access categories, as well as perform all the related interactions with the RRC layer). For IMS voice/video calls, this would be different from LTE, as the IMS client would not be communicating directly with RRC (as with SSAC) but with NAS instead. In this regard, the example communication exchanges illustrated in FIG. 9A and FIG. 9B can be used between the UE NAS layer 406 and the IMS client 426.

FIG. 9A and FIG. 9B illustrate example communication between a NAS layer 902 and an IMS client 904 for access category detection in accordance with some aspects. The NAS layer 902 and the IMS client 904 can be the same as the NAS layer 406 and the IMS client 426, respectively. In some aspects, at 905, the IMS client 904 indicates to the NAS layer 902 that it wants to send signaling for a new IMS service, e.g. an IMS voice call. At 906, the NAS layer 902 can notify the IMS client 904 that access is not allowed due to, e.g., congestion, and later, when congestion is alleviated, NAS layer 902 can notify the IMS client 904 again. In some aspects the IMS client 904 may refrain from sending further indications 905 for the same type of IMS service, until it receives the notification from the NAS layer that congestion is alleviated. At 908, the IMS client 904 can be configured to deliver one or more service requests for the IMS service via the user plane when a notification of no congestion is received from the NAS layer 902 at step 906. In some aspects, the IMS client 904 can communicate the service requests via session initiation protocol (SIP) signaling via the user plane (e.g., SIP 522).

In some aspects and in connection with notification of congestion alleviation as illustrated in FIG. 9A, the NAS layer 902 can, at 906, explicitly inform the IMS client 904 when barring is alleviated, or, as illustrated in FIG. 9B, the NAS layer 902 can share barring timer (e.g., Tbarring) information with the IMS client 904 at the time that the NAS layer informs the IMS client of the barring condition. In some aspects the IMS client 904 may refrain from sending further indications 905 for the same type of IMS service, until the timer Tbarring expires. At 912, the IMS client 904 can communicate one or more service requests for the IMS service via the user plane when a notification of no congestion is received from the NAS layer 902 at step 910.

Access Barring Handling

FIG. 10A and FIG. 10B illustrate example communication between a NAS layer 1002 and an RRC layer 1004 for access barring handling in accordance with some aspects. The NAS layer 1002 and the RRC layer 1004 can be the same as the NAS layer 406 and the RRC layer 405, respectively.

FIG. 10A illustrates a NAS layer 1002 configured to map an access attempt into an access category, and an RRC layer 1004, which is configured to handle access barring (including the barring check and barring time) for a given access category. At 1006, the NAS layer 1002 can communicate a request for RRC connection establishment as well as the access category mapped to an access attempt. The RRC layer 1004 can then handle access barring and establishment of the RRC connection.

FIG. 10B illustrates a communication environment where the NAS layer 1002 is configured to map any access attempts into an access category as well as to handle access barring More specifically, at 1008, the RRC layer 1004 can send access control information (e.g., as received via a system information block), and can also communicate updates to the NAS layer 1002 at any subsequent time that the access control information changes. The NAS layer 1002 then handles the access attempt mapping to obtain an access category (or categories) as well as it handles access barring associated with the determined access category (or categories).

In some aspects, in order to minimize complexity on having access barring broadcasted information up to date in NAS (similar to LTE), the communication sequence in FIG. 10A can be used. In this regard, there is no direct communication between the RRC layer and other upper layers, such as an IMS client, applications or the operating system. The barring timer can be handled by the RRC layer or by the NAS layer. In some aspects, it may be preferable if the NAS layer also handles the barring times, taking into consideration that the NAS layer will also be the first to detect a new access attempt for the same access category. The handling of the barring timer might not need to be specified and can be left to implementation. On other hand, if the UE passed the access barring checks and the RRC layer attempts to establish an RRC connection, the barring time that is triggered by the receipt of an RRC reject message may be handled by RRC (as the NAS layer would not be impacted), unless extended wait time were used similarly to LTE, or it may be handled by the NAS layer.

Rules for Access Categorization

In some aspects, the rules defining the mapping of access attempts to access categories, for the default set of access categories, can be specified by one or more wireless specifications, where different or same requirements as in LTE can be defined. For the configurable set of access categories, the mapping rules may be defined via a set of rules to be applied in a certain order of precedence or via other the mapping principles (e.g., mapping rules can be specified so that the conditions are disjoint), amongst other options.

In some aspects, the UE NAS layer can be responsible for checking and applying the policy rules, defining the mapping of access attempts to access categories, and conveying the applicable access category(s) to the access stratum (AS). In some aspects, the mapping rules can be formulated in such a way that when applied by the NAS layer, the result is one (or potentially more than one) access category which is indicated to AS for a specific network access attempt. While a UE is barred to access the network for a given access category "x" (e.g. associated barring timer "x" is running), the NAS layer would not indicate a new access request for the same access category "x" to the RRC layer, but could indicate to the RRC layer a sub-sequent request for a different access category "y", if the latter is not barred. In some aspects, the other category can be of a higher priority—(predefined order of priority or mapped out in the policy rules). In this regard, for a specific access attempt, the NAS layer can be configured to provide only one access category to the RRC layer (and it is up to the NAS layer to determine the access category based on the mapping rules). Moreover, while a UE is barred for a given access category, the NAS layer can be configured to indicate to the RRC layer a subsequent request for a different access category, if based on the rules the new access attempt is mapped to this different access category.

In some aspects and in connection with the following use cases, the UE NAS layer may need to take into consideration more than one access category for a given access request:

i) A first use case of this kind is an emergency call initiated by a subscriber who, by subscription, is a member of one or more of the special access classes AC 11-15. In this case, the UE can be allowed to access the network if access for the purpose of emergency call is allowed for all subscribers (e.g., as indicated by the AC10 bit in the system information broadcast) or if access is allowed for any of the special access classes of which the subscriber is a member. In this regard and based on the minimum default set of access categories, the NAS layer can be configured to map the access attempt to at least two access categories (one for emergency and one for a special access class), and in an extreme case, to six access categories (one for emergency and one for each of the five special access classes). Then the RRC layer may need to check whether access is allowed for at least one of the access categories indicated by the NAS layer. As soon as the check is passed for one of the categories, the RRC layer can be configured to proceed with the access and inform the NAS layer accordingly.

ii) A second use case is a low priority access, which can be controlled by Extended Access Barring (EAB). In some aspects, the UE can be allowed to access the network if it first passes an EAB specific check (which depends on the relationship between the UE and the PLMN the UE is accessing e.g., whether the UE is in its HPLMN or in a VPLMN) and then, additionally, passes the check which a 'normal priority' access would have to pass in the same situation. For example, if a 'normal priority' access would need to pass the check for MO signaling (if the UE wants to perform a TAU procedure) or the check for MO data (if the UE wants to send user data to the network), the corresponding low priority access would first need to pass the check for EAB and then the check for MO signaling or MO data, respectively. In this regard, according to the minimum default set of access categories, the NAS layer can be configured to map the access attempt to two access categories: one for EAB and one for MO signaling or MO data, respectively. The RRC layer may then check whether access is allowed for the access categories indicated by the NAS layer. When both checks are passed, the RRC layer can proceed with the access and inform the NAS layer accordingly.

In some aspects, in instances when an access attempt needs to be mapped to more than one access category, the following different approaches for the NAS-AS interaction can be used:

(1) The NAS layer can be configured to provide more than one access category to the AS, together with the information whether it is sufficient to pass the check for one access category (as for the first use case above) or whether the checks for all access categories need to be passed (as for the second use case above). The AS can be configured to perform all the necessary checks before informing the NAS layer of the final result, or (2) The NAS layer can be configured to provide only one category at a time, and after the AS resolution is done, the NAS layer can be configured to provide the second access category, and so on. If it is intended that AS is not only performing the check, but (when the check is passed) also immediately proceeds with accessing the network, then the second approach can be useful for cases when it is sufficient to pass the check for at least one access category (as in the first use case above).

As there are use cases where the access attempt is mapped to more than one access category, the mapping rules for access categorization and the procedure how to apply these rules may be configured to support this possible outcome. For example, the mapping rules can be checked one-by-one in a certain order of sequence (e.g., defined by a 'precedence level'), until the UE finds the first matching rule, which then defines the (single) applicable access category. This approach, however, may be insufficient for use cases i) and ii) above.

In some aspects, a first possible enhancement is to allow that:

a) a rule can define a mapping to more than one access category. For example for use case i) above, it would be possible to define one rule for each possible combination of special access classes AC 11-15, so that, e.g., for a UE which is a member of AC 11, 12 and 15 and which initiates an emergency call, the access attempt is mapped to access categories 6 (for emergency call), 1 (for AC11), 2 (for AC12) and 5 (for AC 15). This processing however, may require 32 different rules for the purpose of making an emergency call. Another 31 different rules can be needed to describe all the cases where a UE which is a member of at least one special access class wants to access a network for a purpose different from an emergency call.

If we further consider use case ii) above, in order to cover all the possible combinations of EAB checks with the subsequent checks for 'normal priority' access, we would need to multiply the number of rules for the 'normal priority' access by a factor of 4 (e.g., for MO signaling it would be necessary to define one rule for the access attempt without EAB, which is mapped to, e.g., access category 7, and then additionally one rule for each of the 3 EAB categories where the access attempt is mapped, e.g. to access categories A1 (for EAB category a) and 7, or A2 (for EAB category b) and 7, or A3 (for EAB category c) and 7, respectively).

In order to avoid this proliferation of mapping rules, the following enhancements can be used in addition to (or alternatively to) a):

b) A mapping rule may define that after applying mapping defined by the present rule, the UE can check further rules until it finds another matching rule or it has used all the rules.

c) A rule according to a) or b) (i.e., defining a mapping to more than one access category, or defining that the UE is to search for further matching rules) may define whether the UE needs to pass the check for at least one of the one or more access categories ("OR option") or to pass the check for all access categories ("AND option").

d) A rule may just define that the UE stops further checking

For example, for use case i) above the rules could then be defined in the following way:

In some aspects, to obtain a complete set of rules for the default minimum set of access categories, the following additional rule can be inserted at the beginning for paging response:

Rule 1: IF (access for paging response) THEN add Access category=0 AND stop.

Rule 2: IF (access for emergency) AND (no special access class AC 11-15 is used) THEN add Access category=6 AND stop.

Rule 3: IF (access for emergency) AND (any special access class AC 11-15 is used) THEN add Access category=6 AND (check further rules with "OR option").

Rule 4: IF (special access class 11 is used) THEN add Access category=1 AND (check further rules with "OR option").

Rule 5: IF (special access class 12 is used) THEN add Access category=2 AND (check further rules with "OR option").

Rule 6: IF (special access class 13 is used) THEN add Access category=3 AND (check further rules with "OR option").

Rule 7: IF (special access class 14 is used) THEN add Access category=4 AND (check further rules with "OR option").

Rule 8: IF (special access class 15 is used) THEN add Access category=5 AND (check further rules with "OR option").

Rule 9: IF (any special access class AC 11-15 is used) THEN stop.

The UE can be configured to start with checking rule 1. A UE which is not a member of a special access class and initiates an emergency call would detect a match for rule 2. The NAS layer would map the access attempt to access category 6 and stop. Therefore, the NAS layer would indicate access category 6 (only) to the RRC layer.

A UE which is a member of AC 11, 12 and 15 and initiates an emergency call, would detect a first match for rule 3. The NAS layer would map the access attempt to access category 6 and continue with checking further rules, using the "OR option". The UE would then detect that there is a match for rule 4 (as special access class 11 is used), map the access (additionally) to access category 1, and continue with checking further rules. The UE would also detect further matches for rules 5 and 8, and map the access (additionally) to access categories 2 and 5, and finally stop after processing rule 9 with a set of access categories including 1, 2, 5 and 6. Therefore, the NAS layer would indicate access categories 1, 2, 5, and 6 to the RRC layer.

In this way, the mapping for access for emergency calls and/or with special access classes 11-15 can be configured with a more limited set of eight rules (instead of 63 rules). In a similar way, the rules for EAB categories a), b), and c) could be specified as follows:

Rule 10: IF (access for EAB categories a) THEN add Access category=A1 AND (check further rules with "AND option").

Rule 11: IF (access for EAB categories b) THEN add Access category=A2 AND (check further rules with "AND option").

Rule 12: IF (access for EAB categories c) THEN add Access category=A3 AND (check further rules with "AND option").

In some aspects, the following rules for 'normal priority' access can be used:

Rule 13: IF (access for IMS voice) THEN add Access category=B1 AND stop.

Rule 14: IF (access for IMS video) THEN add Access category=B2 AND stop.

Rule 15: IF (access for SMS) THEN add Access category=B3 AND stop.

Rule 16: IF (access for MO signalling) THEN add Access category=7 AND stop.

Rule 17: IF (access for MO data) THEN add Access category=8 AND stop.

In some aspects, a UE performing a low priority access with EAB category a) for MO signaling would not detect any match for rules 1 or 9, as it does not initiate an emergency call and does not respond to paging. Furthermore, UEs using AC 11-15 do not perform low priority access. The UE would detect a first match for rule 10, so it would map the access attempt to access category A1, and continue with checking further rules, using the "AND option". Next, the UE would detect that there is a match for rule 16, map the access attempt (additionally) to access category 7 and stop. Therefore, the NAS layer can indicate access categories A1 and 7 to the RRC layer. In this regard, a set of 17 (instead of 84) rules would be sufficient to cover the default minimum set of access categories.

In some aspects, a request for an RRC connection can be mapped to more than one access category. In circumstances when a NAS layer merely selects the first access category that matches with the UE's characteristics and reason for access, a user's access attempt can be barred when it should not (e.g., in the case of a UE that has more than one special AC) or that user's access attempt might be allowed through when more detailed matching of the UE's other characteristics would have result in an access attempt being barred (e.g., when not all of the UE's EAB categories have been checked).

FIG. 11A, FIG. 11B, and FIG. 11C illustrate table 1100 with example rules and conditions for default and well-known set of access categories in accordance with some aspects. For example, table 1100 includes the two proposed sets of access categories illustrated in FIG. 7 and FIG. 8, together with formulated rules and conditions that need to be applied to derive the access categories to be used for access control when upper layers request access to resources. The information of FIG. 7 and FIG. 8 is captured in columns 2, 3 and 4 of table 1100.

As analyzed above, one cannot stop checking other matching access categories upon detecting a matching access category. For instance, a UE having one or more of the special AC is attempting an emergency call. Another use case, a UE making a MO Call or wanting MO signalling could belong to one of the 3 EAB categories and there has to be an order to determining the access categories that applies if that UE wants to access for resources. In this regard, step s can be created to define an order of the processing rules with some precedence in order to perform the checking for these possible multiple access categories. Further explanation is provided in columns 1 and 5 of table 1100.

In some aspects, the NAS layer can be configured to stop further rule checking to determine other matching access categories. In some aspects, this may be indicated by including a "NOTE 1" or the words "IF MATCHING, STOP" in column 5 of table 1100. With one or more of the "matched" access categories found, the NAS layer can interface with the RRC layer. Access control is passed if it is determined that access is allowed for any of the "matched" access categories. In some aspects, this may be indicated by including a "NOTE 1" in column 5 of table 1100.

In some aspects and in connection with an LTE network, the network will broadcast (e.g., in SIB14) a single bitmap for AC 0 to 9 together with an indication whether this bitmap is applicable for EAB category 'a', 'b' or 'c'. The UE can then determine whether it belong to the respective category and if yes, whether its own AC is affected by the barring In some aspect, the categories can be defined so that each member of 'c' is also a member of 'b', and each member of 'b' is also a member of 'a', i.e., a)<b)<c).

For NR networks, the information to be broadcasted by the network could be defined in different ways. For example, in some aspect, the network could broadcast parameters for all 3 categories, and if EAB is applicable only to 'b' and 'c', but not to 'a' (i.e. not to UEs which are in their HPLMN or EHPLMN), then the network could set the barring parameters for 'b' and 'c' to the same values, and the barring parameters for 'a' to values which guarantee a 'pass'. A UE configured for EAB could be configured to determine the 'highest' category of which it is a member (where 'a'<'b'<'c'), and map this highest category (e.g. 'b') to an access category (e.g. 'A2') which is then used for the access barring check. In some aspects, this may be indicated by including a "NOTE 2" in column 4 of table 1100. In some other aspect, the network could broadcast parameters for only one category, e.g. 'b', and it could broadcast additional information, e.g., as for the case in connection with an LTE network above, an indication whether the parameters are applicable for EAB category 'a', 'b' or 'c'. In some aspect, the access control check may require the exchange of additional information between the NAS layer and AS.

In some aspects, the NAS layer can be configured to stop further rule checking to determine other matching access categories. With one or more of the "matched" access categories found, the NAS layer can interface with the RRC layer. Access control can be considered passed if it is determined that access is allowed for all of the "matched" access categories. In some aspects, this may be indicated by including a "NOTE 3" in column 5 of table 1100.

Figure 12:
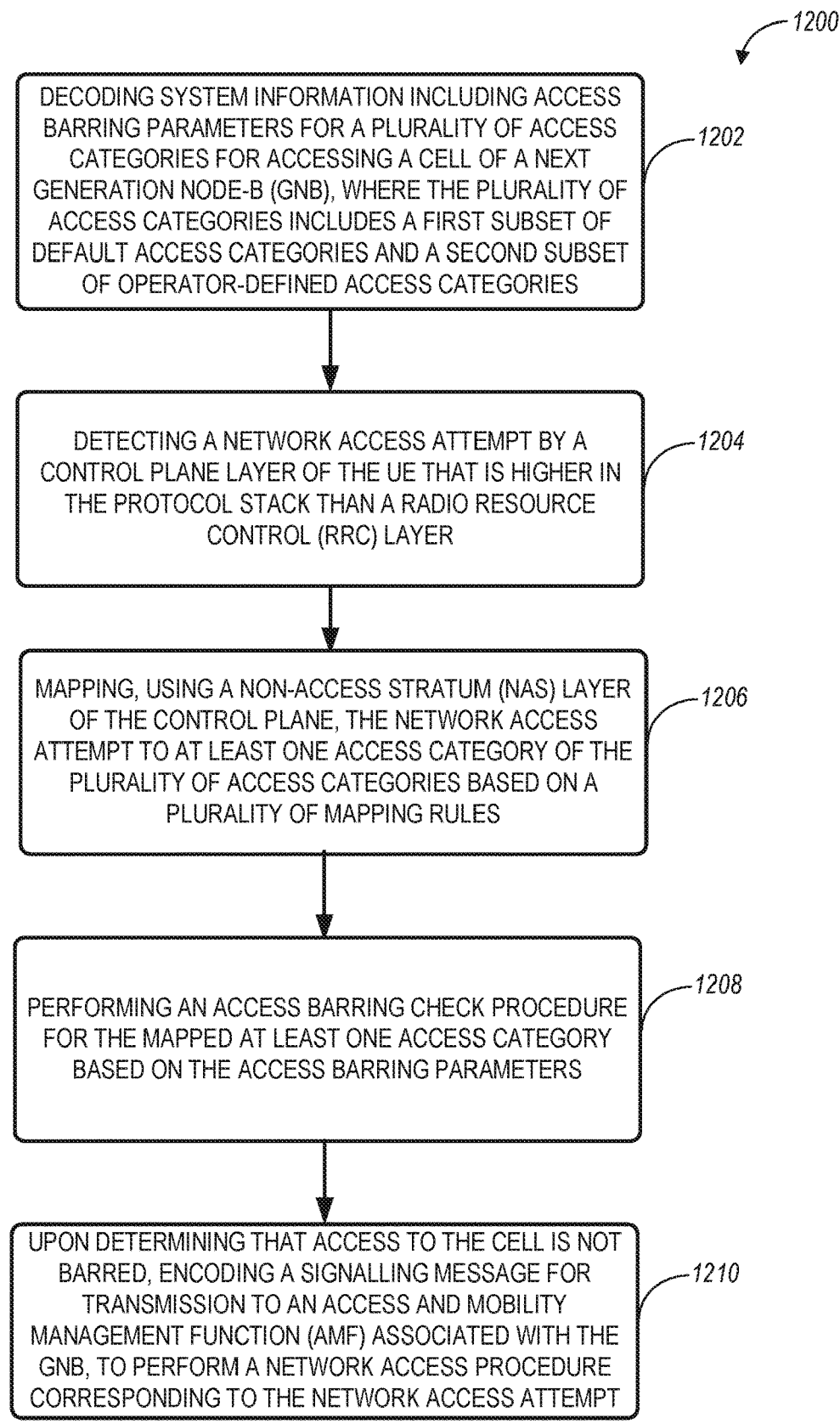
FIG. 12 illustrates generally a flowchart of example functionalities which can be performed in a 5G wireless architecture in connection with access control, in accordance with some aspects.

FIG. 12 illustrates generally a flowchart of example functionalities of a method 1200, which can be performed in a 5G wireless architecture (e.g., by a UE) in connection with access control, in accordance with some aspects. Referring to FIG. 12, at 1202, system information including access barring parameters for a plurality of access categories for accessing a cell of a next generation Node-B (gNB) can be decoded. The plurality of access categories can include a first subset of default access categories and a second subset of operator-defined access categories. At 1204, a network access attempt can be detected by a control plane layer of the UE that is higher in the protocol stack than a Radio Resource Control (RRC) layer. For example, the network access attempt can be detected by a NAS layer 406. At 1206, the network access attempt can be mapped to at least one access category of the plurality of access categories based on a plurality of mapping rules. In some aspects, the mapping can be performed by the NAS layer 406 of the control plane. At 1208, an access barring check procedure can be performed for the mapped at least one access category based on the access barring parameters. At 1210, upon determining that access to the cell is not barred, a configuration message can be encoded for transmission to a Mobility Management Entity (MME) associated with the gNB, to perform a network access procedure corresponding to the network access attempt.

Figure 13:
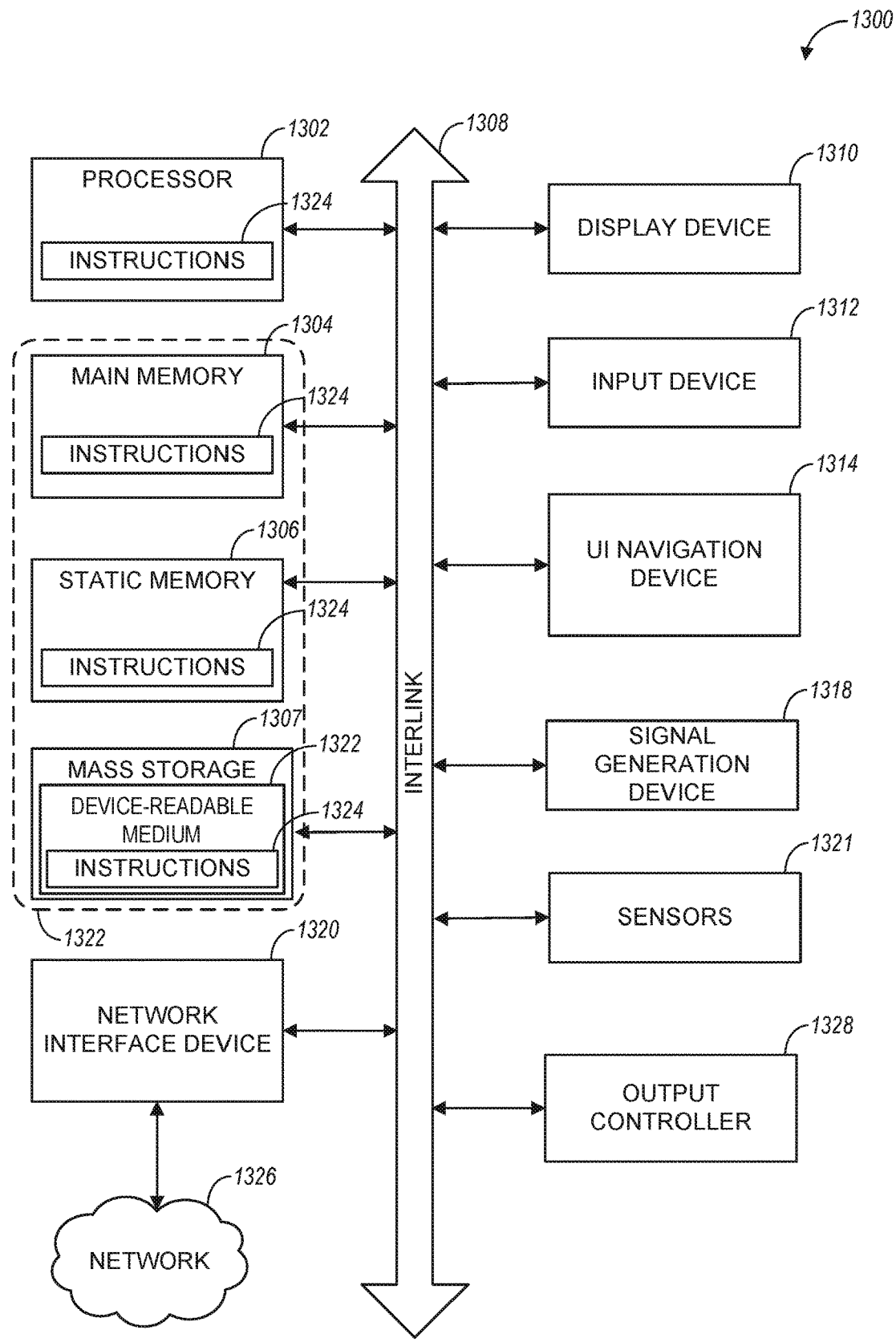
FIG. 13 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 13 illustrates a block diagram of a communication device such as an evolved Node-B (eNB), a new generation Node-B (gNB), an access point (AP), a wireless station (STA), a mobile station (M S), or a user equipment (UE), in accordance with some aspects. In alternative aspects, the communication device 1300 may operate as a standalone device or may be connected (e.g., networked) to other communication devices.

Circuitry (e.g., processing circuitry) is a collection of circuits implemented in tangible entities of the device 1300 that include hardware (e.g., simple circuits, gates, logic, etc.). Circuitry membership may be flexible over time. Circuitries include members that may, alone or in combination, perform specified operations when operating In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1300 follow.

In some aspects, the device 1300 may operate as a standalone device or may be connected (e.g., networked) to other devices. In a networked deployment, the communication device 1300 may operate in the capacity of a server communication device, a client communication device, or both in server-client network environments. In an example, the communication device 1300 may act as a peer communication device in peer-to-peer (P2P)(or other distributed) network environment. The communication device 1300 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1300 may include a hardware processor 1302 (e.g., a central processing unit (CPU), a graphics processing unit (GPU), a hardware processor core, or any combination thereof), a main memory 1304, a static memory 1306, and mass storage 1307 (e.g., hard drive, tape drive, flash storage, or other block or storage devices), some or all of which may communicate with each other via an interlink (e.g., bus) 1308.

The communication device 1300 may further include a display device 1310, an alphanumeric input device 1312 (e.g., a keyboard), and a user interface (UI) navigation device 1314 (e.g., a mouse). In an example, the display device 1310, input device 1312 and UI navigation device 1314 may be a touch screen display. The communication device 1300 may additionally include a signal generation device 1318 (e.g., a speaker), a network interface device 1320, and one or more sensors 1321, such as a global positioning system (GPS) sensor, compass, accelerometer, or other sensor. The communication device 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1307 may include a communication device-readable medium 1322, on which is stored one or more sets of data structures or instructions 1324 (e.g., software) embodying or utilized by any one or more of the techniques or functions described herein. In some aspects, registers of the processor 1302, the main memory 1304, the static memory 1306, and/or the mass storage 1307 may be, or include (completely or at least partially), the device-readable medium 1322, on which is stored the one or more sets of data structures or instructions 1324, embodying or utilized by any one or more of the techniques or functions described herein. In an example, one or any combination of the hardware processor 1302, the main memory 1304, the static memory 1306, or the mass storage 1316 may constitute the device-readable medium 1322.

As used herein, the term "device-readable medium" is interchangeable with "computer-readable medium" or "machine-readable medium". While the communication device-readable medium 1322 is illustrated as a single medium, the term "communication device-readable medium" may include a single medium or multiple media (e.g., a centralized or distributed database, and/or associated caches and servers) configured to store the one or more instructions 1324.

The term "communication device-readable medium" may include any medium that is capable of storing encoding or carrying instructions (e.g., instructions 1324) for execution by the communication device 1300 and that cause the communication device 1300 to perform any one or more of the techniques of the present disclosure, or that is capable of storing encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), MIMO, or multiple-input single-output (MISO) techniques.

In some examples, the network interface device 1320 may wirelessly communicate using Multiple User MIMO techniques.

The term "transmission medium" shall be taken to include any intangible medium that is capable of storing encoding or carrying instructions for execution by the communication device 1300, and includes digital or analog communications signals or other intangible medium to facilitate communication of such software. In this regard, a transmission medium in the context of this disclosure is a device-readable medium.

Additional Notes and Examples

Example 1 is an apparatus of a user equipment (UE), the apparatus comprising processing circuitry, the processing circuitry configured to: decode system information including access barring parameters for one or more access categories for accessing a cell of a next generation Node-B (gNB); detect a network access attempt by a control plane layer of the UE that is higher in the protocol stack than a Radio Resource Control (RRC) layer; map, using a Non-Access Stratum (NAS) layer of the control plane, the network access attempt to at least one access category of a plurality of available access categories based on mapping rules; perform an access barring check procedure for the at least one access category based on the access barring parameters within the system information; and upon determining that access to the cell is not barred, encode a NAS message for transmission to an Access and Mobility Management Function (AMF) or a Mobility Management Entity (MME), to perform a NAS signaling procedure; and memory coupled to the processing circuitry, the memory configured to store the mapping rules.

In Example 2, the subject matter of Example 1 includes, wherein the processing circuitry is configured to: upon determining that access to the cell is not barred, encode a configuration message for transmission to the gNB for configuration of an RRC connection and to perform a network access procedure corresponding to the network access attempt.

In Example 3, the subject matter of Examples 1-2 includes, wherein the NAS message is one of the following a registration request for an initial registration procedure; a registration request for a mobility registration update procedure; a registration request for a periodic registration update procedure; a service request for a service request procedure; a PDU session establishment request for a PDU session establishment procedure; an attach request for an attach procedure; a tracking area update (TAU) request for a tracking area updating procedure; a service request or extended service request for a service request procedure; and a packet data network (PDN) connectivity request for a PDN connectivity procedure.

In Example 4, the subject matter of Examples 1-3 includes, wherein the processing circuitry is configured to: perform the access barring check procedure while the UE is in one of: an RRC Idle state, an RRC Connected state, or an RRC Inactive state.

In Example 5, the subject matter of Examples 1-4 includes, wherein the at least one access category to which the network access attempt is mapped is associated with communication of unattended data traffic.

In Example 6, the subject matter of Examples 1-5 includes, wherein the plurality of available access categories includes a first subset of default access categories and a second subset of operator-defined access categories.

In Example 7, the subject matter of Example 6 includes, wherein the second subset of operator-defined access categories are applicable to a plurality of UEs within a public land mobile network (PLMN) associated with the gNB and to at least another UE for which the PLMN is not a Home PLMN (HPLMN).

In Example 8, the subject matter of Examples 6-7 includes, wherein the second subset of operator-defined access categories is configurable via Open Mobile Alliance (OMA) signaling or NAS signaling.

In Example 9, the subject matter of Examples 6-8 includes, wherein the processing circuitry is configured to: decode configuration information including a subset of the mapping rules associated with the operator-defined access categories.

In Example 10, the subject matter of Examples 6-9 includes, wherein the mapping rules comprise a set of pre-defined mapping rules associated with the first subset of default access categories.

In Example 11, the subject matter of Example 10 includes, wherein the set of pre-defined mapping rules associated with the first subset of default access categories includes mapping rules for network access attempts, the network access attempt being an initial access attempt associated with one or more of the following initial attach or initial registration to a network of the gNB after public land mobile network (PLMN) selection; inter-PLMN tracking area update (TAU) or mobility registration update (MRU); network access for an emergency communication; network access for a high priority call; and network access for receiving low priority services.

In Example 12, the subject matter of Examples 10-11 includes, wherein the first subset of default access categories includes access categories for one or more of the following mobile originating (MO) signaling MO data; IP Multimedia Subsystem (IMS) voice call; IMS video call; emergency communication; subscribers of special access classes (ACs) 11-15; low priority signaling and short message service (SMS).

In Example 13, the subject matter of Examples 10-12 includes, wherein the set of pre-defined mapping rules is applicable within a public land mobile network (PLMN) associated with the gNB and one or more other PLMNs.

In Example 14, the subject matter of Examples 1-13 includes, wherein the network access attempt is for accessing a network of the gNB for responding to a paging message, and wherein the processing circuitry is configured to: map the network access attempt to an access category "null"; and encode a response message to the paging message, without performing the access barring check procedure.

In Example 15, the subject matter of Examples 1-14 includes, wherein the access barring parameters include a barring time indicating a waiting period for repeating the access barring check procedure for the one or more access categories, when the access barring check procedure for the one or more access categories fails.

In Example 16, the subject matter of Examples 1-15 includes, wherein the mapped at least one access category comprises two or more access categories, and wherein the processing circuitry is configured to: perform separate access barring check procedures for each of the two or more access categories based on the access barring parameters within the system information.

In Example 17, the subject matter of Examples 1-16 includes, wherein the access barring parameters comprise a plurality of sets of access barring parameters, each of the sets of access barring parameters corresponding to at least one of the one or more access categories, and wherein the processing circuitry is configured to: perform the access barring check procedure for the mapped at least one access category based on the plurality of sets of access barring parameters within the system information.

In Example 18, the subject matter of Example 17 includes, wherein the processing circuitry is configured to: perform the access barring check procedure for the mapped at least one access category for two or more sets of the plurality of sets of access barring parameters within the system information, the two or more sets of access barring parameters being selected based on whether the UE has a subscription for one or more of special access classes (ACs) 11-15.

In Example 19, the subject matter of Examples 17-18 includes, wherein the processing circuitry is configured to: determine that access to the cell is not barred when the access barring check procedure is successful based on passing the check for a single set of the plurality of sets of access barring parameters.

In Example 20, the subject matter of Examples 17-19 includes, wherein the processing circuitry is configured to: determine that access to the cell is not barred when the access barring check procedure is successful based on passing the check for all of the plurality of sets of access barring parameters.

In Example 21, the subject matter of Examples 1-20 includes, wherein the network access attempt is for one or more low priority services, and wherein the processing circuitry is configured to: map the network access attempt to at least one access category for the low priority services, when the UE is configured to use the at least one access category for the low priority services.

In Example 22, the subject matter of Example 21 includes, wherein the access barring parameters include one or more access barring parameters associated with the at least one access category for the low priority services, and wherein the one or more access barring parameters include an indication that the mapping of the network access attempt to the at least one access category for low priority services is applicable to the UE when there is a pre-defined relationship between the UE and a public land mobile network (PLMN) associated with the gNB.

In Example 23, the subject matter of Example 22 includes, wherein the pre-defined relationship is one of: the UE is within a PLMN; the UE is within a PLMN that is not a HPLMN or a PLMN that is equivalent to the HPLMN; and the UE is within a PLMN that is not a HPLMN or a PLMN that is equivalent to the HPLMN or a PLMN listed as a most preferred PLMN in a country where the UE is roaming.

In Example 24, the subject matter of Examples 1-23 includes, wherein each of the mapping rules includes a condition and an access category to which the network access attempt is mapped when the condition is met.

In Example 25, the subject matter of Example 24 includes, wherein the condition includes one or more of the following characteristics: an access class; a type of access attempt associated with the network access attempt; a home or visitor relationship between the UE and a PLMN the UE is accessing a property of the PLMN the UE is accessing of being a most preferred PLMN in the country of the PLMN; delay tolerance of the UE; and a network slice the UE is trying to access.

In Example 26, the subject matter of Examples 24-25 includes, wherein each of the mapping rules includes a rule precedence value and the processing circuitry is configured to: evaluate the mapping rules to determine a mapping for the network access attempt according to the rule precedence value of each of the mapping rules.

In Example 27, the subject matter of Examples 24-26 includes, wherein the processing circuitry is configured to: cease evaluating the mapping rules when the network access attempt matches the condition of at least one of the mapping rules.

In Example 28, the subject matter of Example 27 includes, wherein the at least one of the mapping rules further includes an indication whether the processing circuitry is to continue evaluating a remaining portion of the mapping rules after the processing circuitry determines that the network access attempt matches the condition of the at least one of the mapping rules.

In Example 29, the subject matter of Examples 24-28 includes, wherein at least one of the mapping rules includes an indicator, and wherein the processing circuitry is configured to: based on the indicator, determine that access to the cell is not barred when the network access attempt is mapped to more than one of the access categories and the access barring check procedure is successful for at least one set of access barring parameters of the decoded access barring parameters.

In Example 30, the subject matter of Examples 24-29 includes, wherein at least one of the mapping rules includes an indicator, and wherein the processing circuitry is configured to: based on the indicator, determine that access to the cell is not barred when the network access attempt is mapped to one or more of the access categories and the access barring check procedure is successful for at least one of two or more sets of the decoded access barring parameters.

In Example 31, the subject matter of Examples 24-30 includes, wherein at least one of the mapping rules includes an indicator, and wherein the processing circuitry is configured to: based on the indicator, determine that access to the cell is not barred when the network access attempt is mapped to more than one of the access categories and the access barring check procedure is successful for all sets of the decoded access barring parameters.

In Example 32, the subject matter of Examples 24-31 includes, wherein at least one of the mapping rules includes an indicator, and wherein the processing circuitry is configured to: based on the indicator, determine that access to the cell is not barred when the network access attempt is mapped to one or more of the access categories and the access barring check procedure is successful for all (of the two or more?) sets of the decoded access barring parameters.

In Example 33, the subject matter of Examples 1-32 includes, wherein the processing circuitry is configured to: encode a configuration message for requesting establishment of an RRC connection, the configuration message including an RRC establishment cause mapped from the at least one access category which the network access attempt is mapped to.

In Example 34, the subject matter of Example 33 includes, wherein the RRC establishment cause is equal to one of the at least one access category which the network access attempt is mapped to.

In Example 35, the subject matter of Examples 33-34 includes, wherein the processing circuitry is configured to provide the at least one access category and the RRC establishment cause to the RRC layer.

In Example 36, the subject matter of Examples 1-35 includes, wherein to detect the network access attempt, the processing circuitry is configured to detect one or more of the following events: detect signalling for initiating a mobility management procedure, including an initial attach or a tracking area update; detecting signalling for initiating a session management procedure, including establishment of a PDU session; receiving an indication from a Radio Access Bearer Manager (RABM) that an uplink (UL) user data packet is pending for which radio bearers need to be established in the user plane; receiving an indication from an IMS client that a setup of an IMS voice call or an IMS video call, or a transfer of a mobile originating SMS over IMS, has been requested; and receiving an indication from an upper layer that a certain application has been started, wherein the upper layer includes an application layer, an operating system layer, or a connection manager.

In Example 37, the subject matter of Example 36 includes, wherein the processing circuitry is configured to: upon receiving the indication from the IMS client that the setup of the IMS voice call or the IMS video call, or the transfer of the mobile originating SMS over IMS, has been requested, cause communication of an outcome of the access barring check procedure to the IMS client via the NAS layer.

In Example 38, the subject matter of Example 37 includes, wherein the processing circuitry is configured to: cause communication of a barring timer to the IMS client via the NAS layer, wherein the barring timer controls the barring time for the setup of the IMS voice call or the IMS video call, or the transfer of the mobile originating SMS over IMS, and the barring timer is running in the IMS client.

In Example 39, the subject matter of Examples 1-38 includes, wherein the processing circuitry is configured to: perform using the NAS layer, the access barring check procedure based on the access barring parameters provided by the RRC layer.

In Example 40, the subject matter of Examples 1-39 includes, wherein the processing circuitry is configured to: perform using the NAS layer, the access barring check procedure based on the access barring parameters provided by an access stratum (AS).

In Example 41, the subject matter of Examples 1-40 includes, wherein the processing circuitry is configured to: perform using the RRC layer, the access barring check procedure based on the at least one access category the network access attempt is mapped to, the at least one access category being provided by the NAS layer to the RRC layer.

In Example 42, the subject matter of Example 41 includes, wherein the one or more access categories include at least two access categories provided by the NAS layer to the RRC layer, and wherein the processing circuitry is configured to: provide an indication to the RRC layer via the NAS layer whether the access barring check procedure is successful if the UE passes a barring check for at least one set of the access barring parameters.

In Example 43, the subject matter of Examples 41-42 includes, wherein the access barring check procedure is based on two or more sets of the access barring parameters, and wherein the processing circuitry is configured to: provide an indication to the RRC layer via the NAS layer whether the access barring check procedure is successful if the UE passes a barring check for at least one of the two or more sets of the access barring parameters.

In Example 44, the subject matter of Examples 41-43 includes, wherein the one or more access categories include at least two access categories provided by the NAS layer to the RRC layer, and wherein the processing circuitry is configured to: provide an indication to the RRC layer via the NAS layer whether the access barring check procedure is successful if the UE passes a barring check for all sets of the access barring parameters.

In Example 45, the subject matter of Examples 41-44 includes, wherein the access barring check procedure is based on two or more sets of the access barring parameters, and wherein the processing circuitry is configured to: provide an indication to the RRC layer via the NAS layer whether the access barring check procedure is successful if the UE passes a barring check for all of the two or more sets of the access barring parameters.

In Example 46, the subject matter of Examples 1-45 includes, wherein a timer controlling barring time when access to the cell is barred, is running in the RRC layer.

In Example 47, the subject matter of Examples 1-46 includes, wherein a timer controlling barring time when access to the cell is barred, is running in the NAS layer.

In Example 48, the subject matter of Examples 1-47 includes, transceiver circuitry coupled to the processing circuitry; and, one or more antennas coupled to the transceiver circuitry.

Example 49 is an apparatus of a Next Generation Node-B (gNB), the apparatus comprising memory; and processing circuitry, configured to: encode a set of operator-defined access categories for transmission to a user equipment (UE) within a public land mobile network (PLMN) associated with the gNB; encode system information including access barring parameters for the operator-defined access categories for accessing a cell of the gNB; encode a set of mapping rules for transmission to the UE, the set of mapping rules associated with the set of operator-defined access categories; and decode a configuration message for granting access to the cell, wherein the configuration message is received after an access barring check procedure performed at the UE in response to a network access attempt, the access barring check procedure being based on a mapping of the network access attempt to the set operator-defined access categories using the set of mapping rules.

In Example 50, the subject matter of Example 49 includes, wherein the access barring check procedure is further based on the access barring parameters.

In Example 51, the subject matter of Examples 49-50 includes, wherein the subset of operator-defined access categories is configurable via Open Mobile Alliance (OMA) signaling or NAS signaling.

In Example 52, the subject matter of Examples 49-51 includes, wherein each of the mapping rules includes a condition and an access category of the set of operator-defined access categories or a set of default access categories to which the network access attempt is mapped when the condition is met.

Example 53 is a non-transitory computer-readable storage medium that stores instructions for execution by one or more processors of a user equipment (UE), the instructions to configure the one or more processors to cause the UE to: decode system information including access barring parameters for a plurality of access categories for accessing a cell of a next generation Node-B (gNB), wherein the plurality of access categories includes, a first subset of default access categories and a second subset of operator-defined access categories; detect a network access attempt by a control plane layer of the UE that is higher in a protocol stack than a Radio Resource Control (RRC) layer; map, using a Non-Access Stratum (NAS) layer of the control plane, the network access attempt to at least one access category of the plurality of access categories based on mapping rules; perform an access barring check procedure for the mapped at least one access category based on the access barring parameters; and upon determining that access to the cell is not barred, encode a Non-Access Stratum (NAS) message for transmission to an Access and Mobility Management Function (AMF) associated with the gNB, to perform a NAS signaling procedure.

In Example 54, the subject matter of Example 53 includes, wherein the instructions further cause the UE to: upon determining that access to the cell is not barred, encode a configuration message for transmission to a gNB, to perform a network access procedure corresponding to the network access attempt.

In Example 55, the subject matter of Examples 53-54 includes, wherein the instructions further cause the UE to: perform the access barring check procedure while the UE is in one of: an RRC Idle state, an RRC Connected state, or an RRC Inactive state.

In Example 56, the subject matter of Examples 53-55 includes, wherein the at least one access category to which the network access attempt is mapped is associated with communication of unattended data traffic.

In Example 57, the subject matter of Examples 53-56 includes, wherein the second subset of operator-defined access categories are applicable to a plurality of UEs within a public land mobile network (PLMN) associated with the gNB and to at least another UE for which the PLMN is not a Home PLMN (HPLMN).

In Example 58, the subject matter of Examples 53-57 includes, wherein the second subset of operator-defined access categories are configurable via Open Mobile Alliance (OMA) signaling or NAS signaling.

In Example 59, the subject matter of Examples 53-58 includes, wherein the instructions further cause the UE to: decode configuration information including a subset of the mapping rules associated with the operator-defined access categories.

In Example 60, the subject matter of Examples 53-59 includes, wherein the mapping rules comprise a set of pre-defined mapping rules associated with the first subset of default access categories.

In Example 61, the subject matter of Example 60 includes, wherein the set of pre-defined mapping rules is applicable within a public land mobile network (PLMN) associated with the gNB and one or more other PLMNs.

In Example 62, the subject matter of Examples 60-61 includes, wherein the set of pre-defined mapping rules is associated with a first subset of default access categories and includes mapping rules for network access attempt associated with one or more of the following initial attach to a network of the gNB after public land mobile network (PLMN) selection; inter-PLMN tracking area update (TAU); network access for an emergency communication; network access for a high priority call; and network access for receiving low priority services.

In Example 63, the subject matter of Examples 53-62 includes, wherein the first subset of default access categories includes access categories for one or more of the following mobile originating (MO) signaling MO data; IP Multimedia Subsystem (IMS) voice call; IMS video call; emergency communication; subscribers of special access classes (ACs) 11-15; low priority signaling and short message service (SMS).

In Example 64, the subject matter of Examples 53-63 includes, wherein the network access attempt is for accessing a network of the gNB for responding to a paging and wherein the instructions further cause the UE to: map the network access attempt to an access category "null"; and encode a response message to the paging without performing the access barring check procedure.

In Example 65, the subject matter of Examples 53-64 includes, wherein the access barring parameters include a barring time indicating a waiting period for repeating the access barring check procedure for the at least one access category, when the access barring check procedure for the at least one access category fails.

In Example 66, the subject matter of Examples 53-65 includes, wherein the mapped at least one access category comprises two or more access categories, and wherein the instructions further cause the UE to: perform separate access barring check procedures for each of the two or more access categories based on the access barring parameters within the system information.

Example 67 is at least one machine-readable medium including instructions that, when executed by processing circuitry, cause the processing circuitry to perform operations to implement of any of Examples 1-66.

Example 68 is an apparatus comprising means to implement of any of Examples 1-66.

Example 69 is a system to implement of any of Examples 1-66.

Example 70 is a method to implement of any of Examples 1-66.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to betaken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any singe aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a singe aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus, comprising:
at least one processor configured to cause a user equipment (UE) to:
decode a plurality of operator defined access categories from one or more Non-Access Stratum (NAS) messages that are higher in a protocol stack than a Radio Resource Control (RRC) layer;
detect a network access attempt at the NAS layer of the UE;
after detecting the network access attempt, provide one operator-defined access category from the NAS layer of the UE to the RRC layer of the UE;
wherein the UE uses a policy to derive from the decoded operator-defined access categories the operator-defined access category that is provided from the NAS to the RRC layer of the UE;
subsequently, receive at the NAS layer of the UE indication that the network access attempt is not barred.

2. The apparatus of claim 1, wherein the at least one processor is further configured to cause the UE to:
upon determining that the network access attempt is not barred, encode a configuration message for transmission to a base station for configuration of an RRC connection and to perform a network access procedure corresponding to the network access attempt.

3. The apparatus of claim 1, wherein the network access attempt is due to one or more pending uplink user data packets.

4. The apparatus of claim 1, wherein the at least one processor is further configured to cause the UE to:
perform the access barring check procedure while the UE is in one of: an RRC Idle state, an RRC Connected state, or an RRC Inactive state.

5. The apparatus of claim 1, wherein the operator-defined access categories are applicable to a plurality of UEs within a public land mobile network (PLMN) associated with a base station and to at least another UE for which the PLMN is not a Home PLMN (HPLMN).

6. The apparatus of claim 1, wherein the policy is defined in the NAS protocol.

7. The apparatus of claim 6, wherein the policy defined in the NAS protocol is based on the one or more NAS messages.

8. The apparatus of claim 1, wherein the one or more NAS messages provide one or more standardized access categories in addition to the operator-defined access categories.

9. The apparatus of claim 1, wherein the NAS layer of the Network is a 5G NAS layer.

10. The apparatus of claim 1, wherein the NAS layer of the UE is a 5G NAS layer.

11. The apparatus of claim 1, wherein the RRC layer of the UE is a New Radio (NR) layer.

12. The apparatus of claim 1, wherein the NAS layer also provides an RRC establishment cause to the RRC layer.

13. A user equipment (UE), comprising:
wireless communication circuitry; and
at least one processor coupled to the wireless communication circuitry and configured to cause the UE to:
decode a plurality of operator-defined access categories from one or more Non-Access Stratum (NAS) messages that are higher in a protocol stack than a Radio Resource Control (RRC) layer;
detect a network access attempt at the NAS layer of the UE;
after detecting the network access attempt, provide one operator-defined access category from the NAS layer of the UE to the RRC layer of the UE;
wherein the UE uses a policy to derive from the decoded operator-defined access categories the operator-defined access category that is provided from the NAS to the RRC layer of the UE;
subsequently, receive at the NAS layer of the UE indication that the network access attempt is not barred.

14. The UE of claim 13, wherein the policy is defined in the NAS protocol.

15. The UE of claim 14, wherein the policy defined in the NAS protocol is based on the one or more NAS messages.

16. The UE of claim 13, wherein the one or more NAS messages provide one or more standardized access categories in addition to the operator-defined access categories.

17. The UE of claim 13, wherein the at least one processor is further configured to cause the UE to:
upon determining that the network access attempt is not barred, encode a configuration message for transmission to the base station for configuration of an RRC connection and to perform a network access procedure corresponding to the network access attempt.

18. The UE of claim 13, wherein the at least one processor is further configured to cause the UE to:
perform the access barring check procedure while the UE is in one of: an RRC Idle state, an RRC Connected state, or an RRC Inactive state.

19. A non-transitory computer readable storage medium storing program instructions executable by at least one processor of a user equipment (UE), wherein the at least one processor is configured to cause the UE to:
decode a plurality of operator-defined access categories from one or more Non-Access Stratum (NAS) messages that are higher in a protocol stack than a Radio Resource Control (RRC) layer;
detect a network access attempt at the NAS layer of the UE;
after detecting the network access attempt, provide one operator-defined access category from the NAS layer of the UE to the RRC layer of the UE;
wherein the UE uses a policy to derive from the decoded operator-defined access categories the operator-defined access category that is provided from the NAS to the RRC layer of the UE;
subsequently, receive at the NAS layer of the UE indication that the network access attempt is not barred.

20. The non-transitory computer readable storage medium of claim 19, wherein the policy is defined in the NAS protocol.

* * * * *